Figure 11:
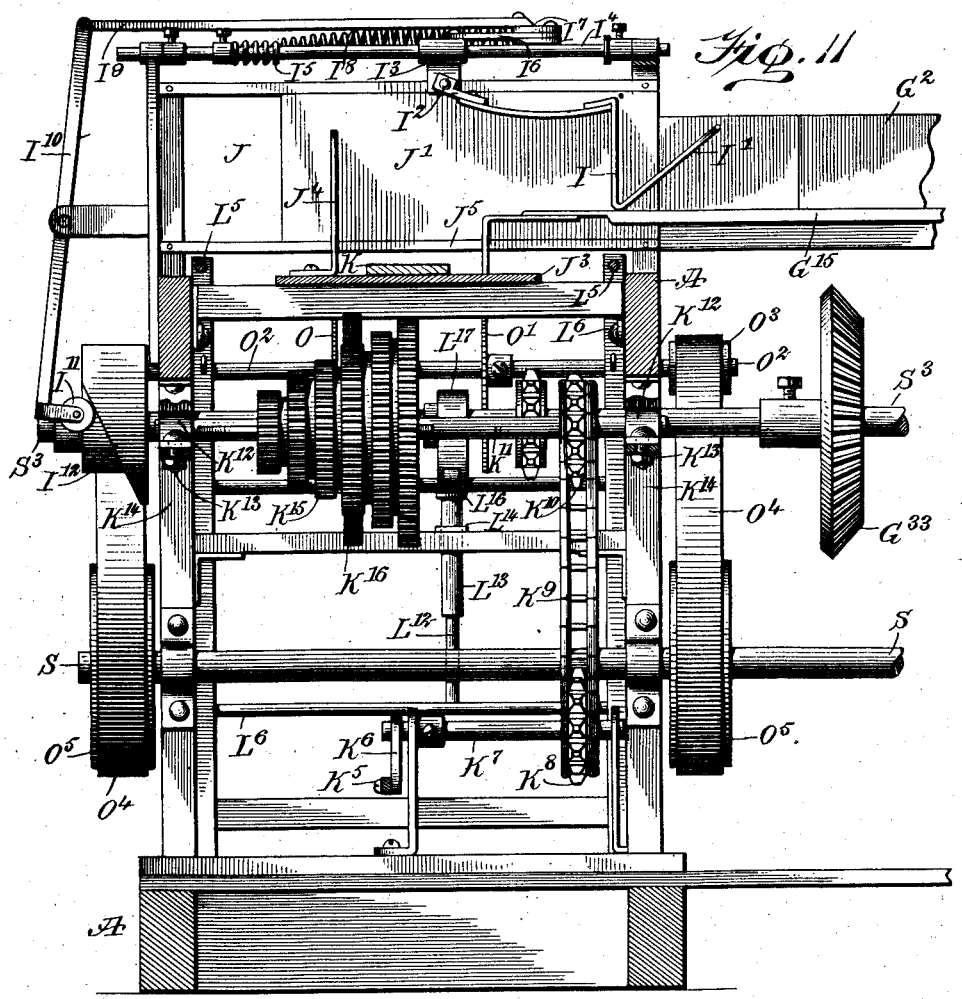

No. 894,017. PATENTED JULY 21, 1908.
C. M. KREBS.
MACHINE FOR MAKING WOOD CARPET SQUARES.
APPLICATION FILED MAY 21, 1906.
10 SHEETS—SHEET 1.
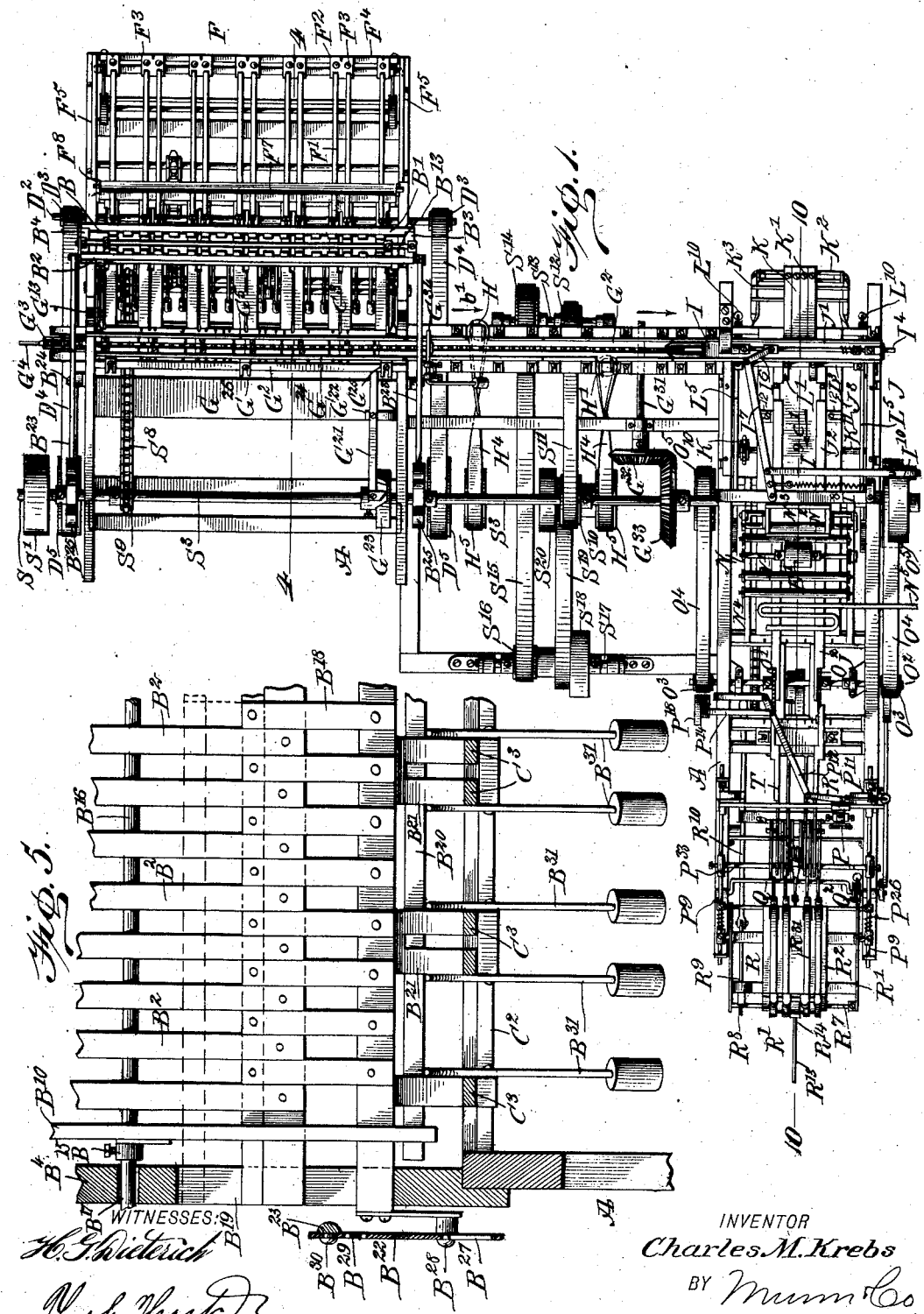
INVENTOR
Charles M. Krebs
BY Munn & Co
ATTORNEYS
WITNESSES:

No. 894,017. PATENTED JULY 21, 1908.
C. M. KREBS.
MACHINE FOR MAKING WOOD CARPET SQUARES.
APPLICATION FILED MAY 21, 1906.
10 SHEETS—SHEET 2.
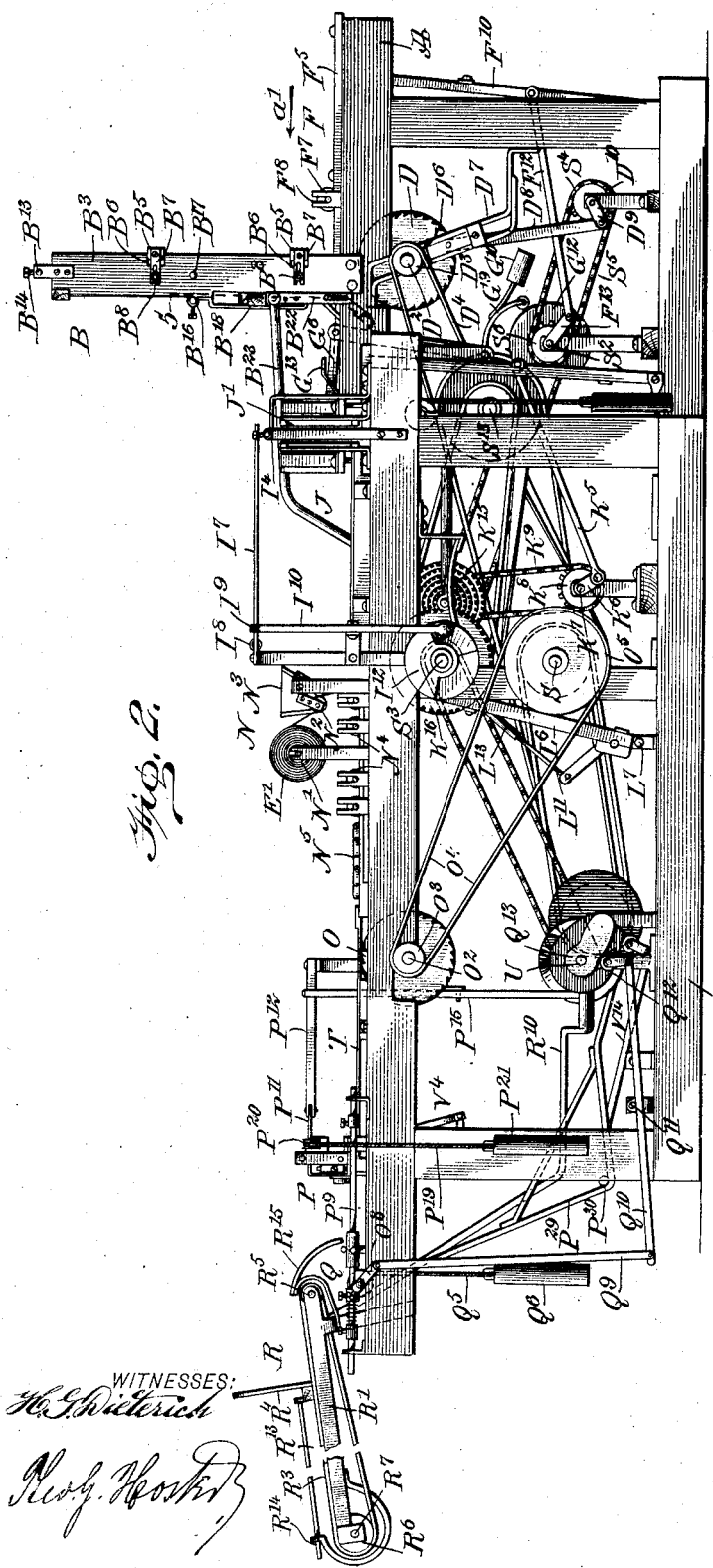
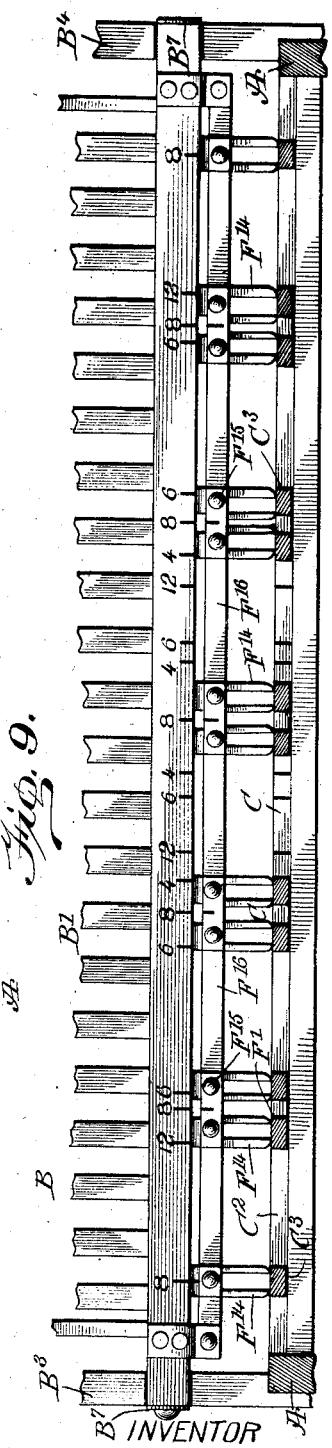
WITNESSES:
INVENTOR
Charles M. Krebs
BY
ATTORNEYS

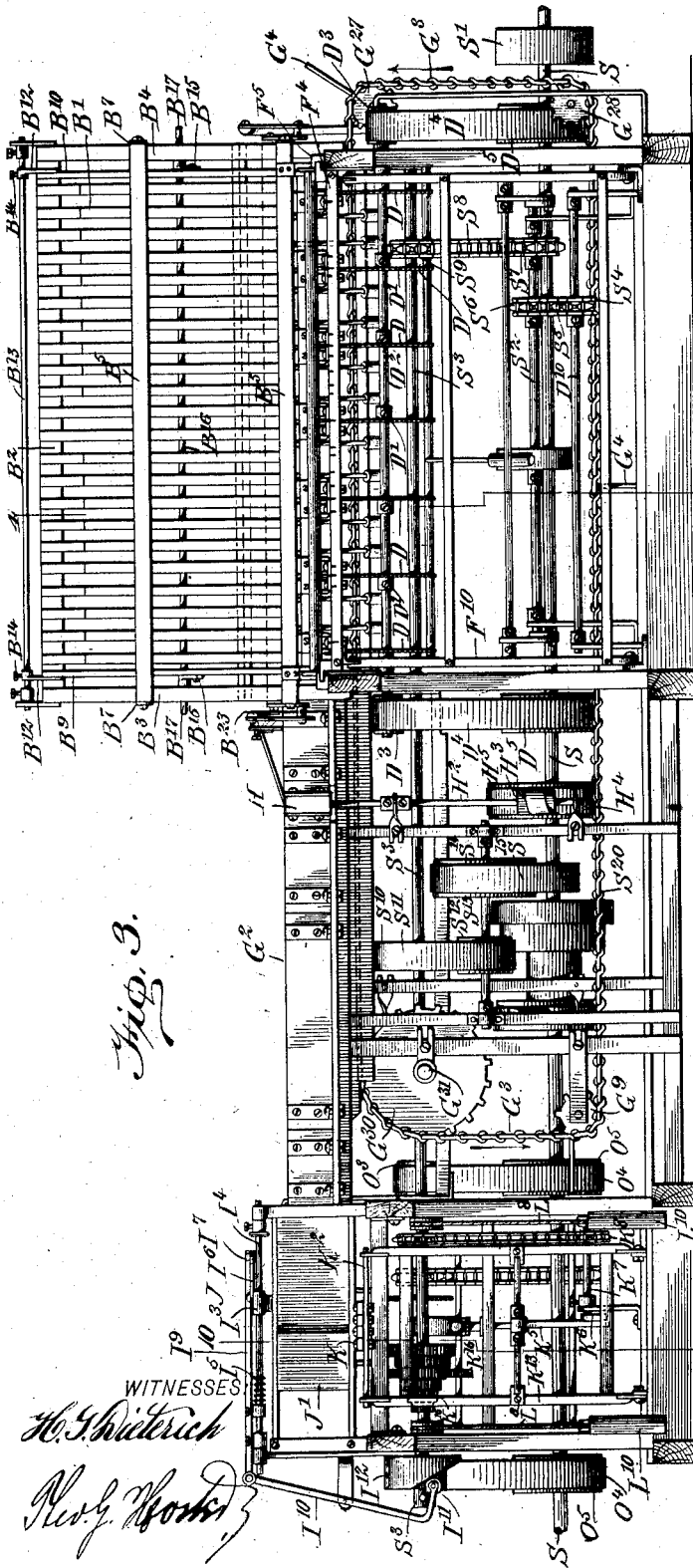

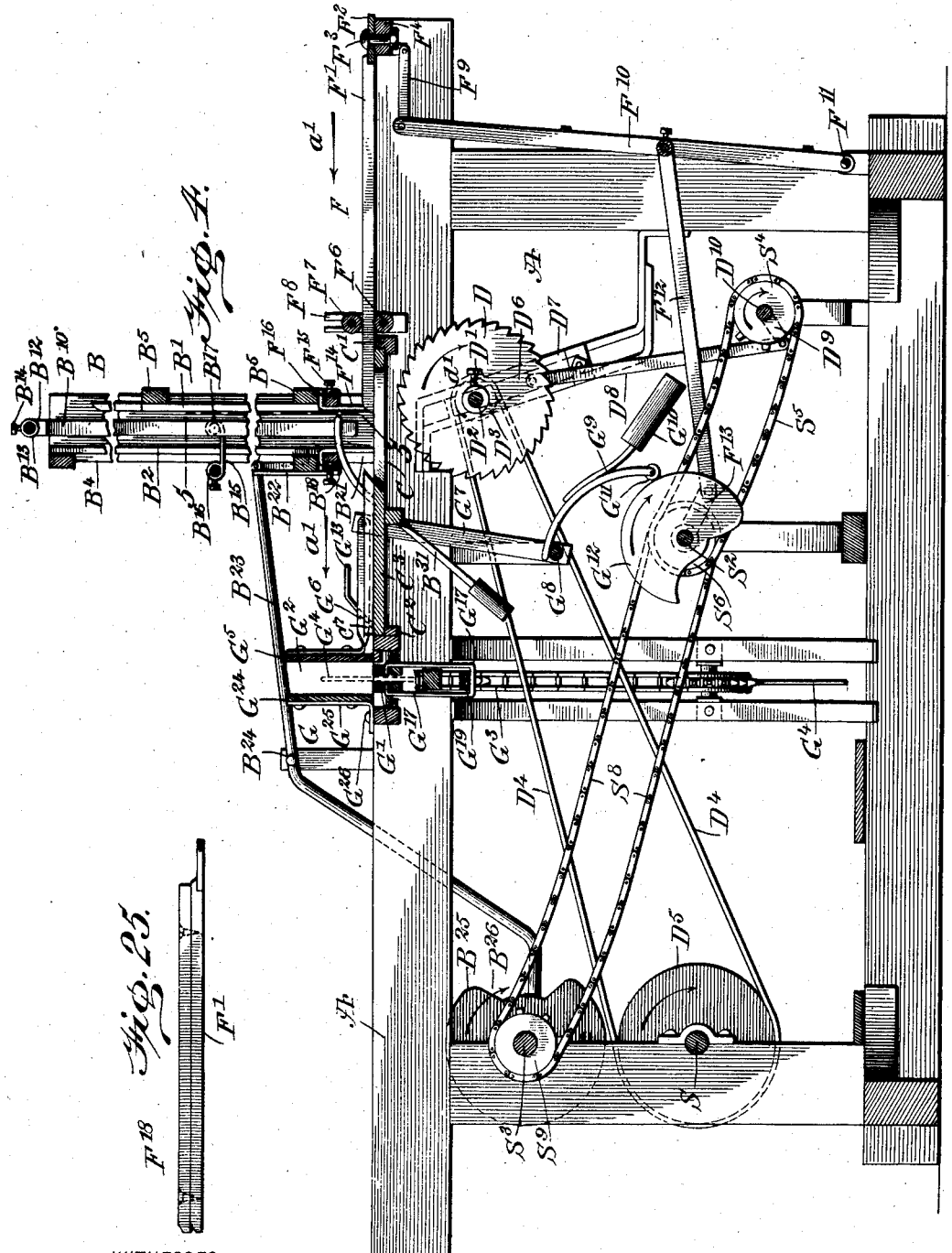

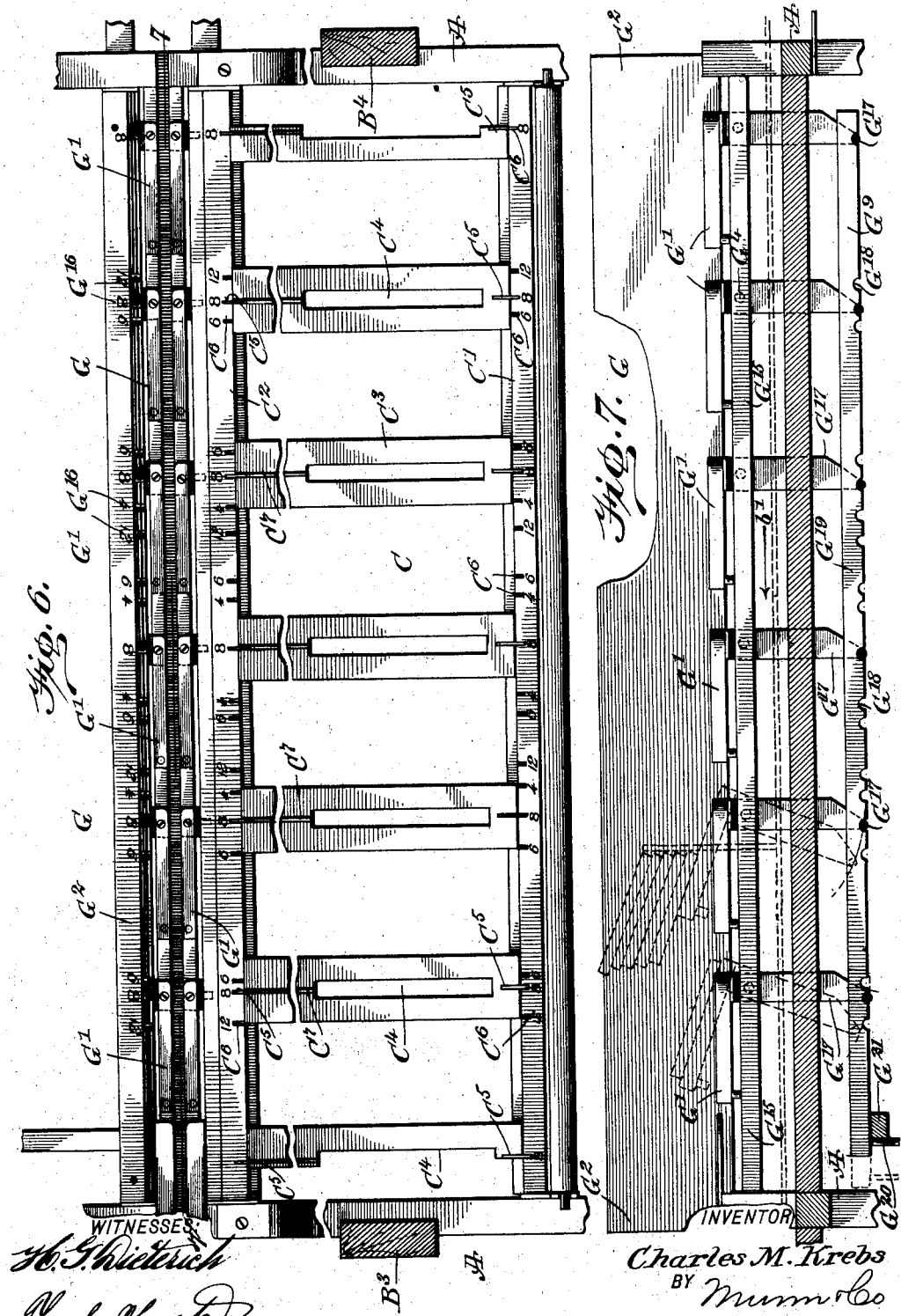

No. 894,017.  
PATENTED JULY 21, 1908.  
C. M. KREBS.  
MACHINE FOR MAKING WOOD CARPET SQUARES.  
APPLICATION FILED MAY 21, 1906.  
10 SHEETS—SHEET 6.
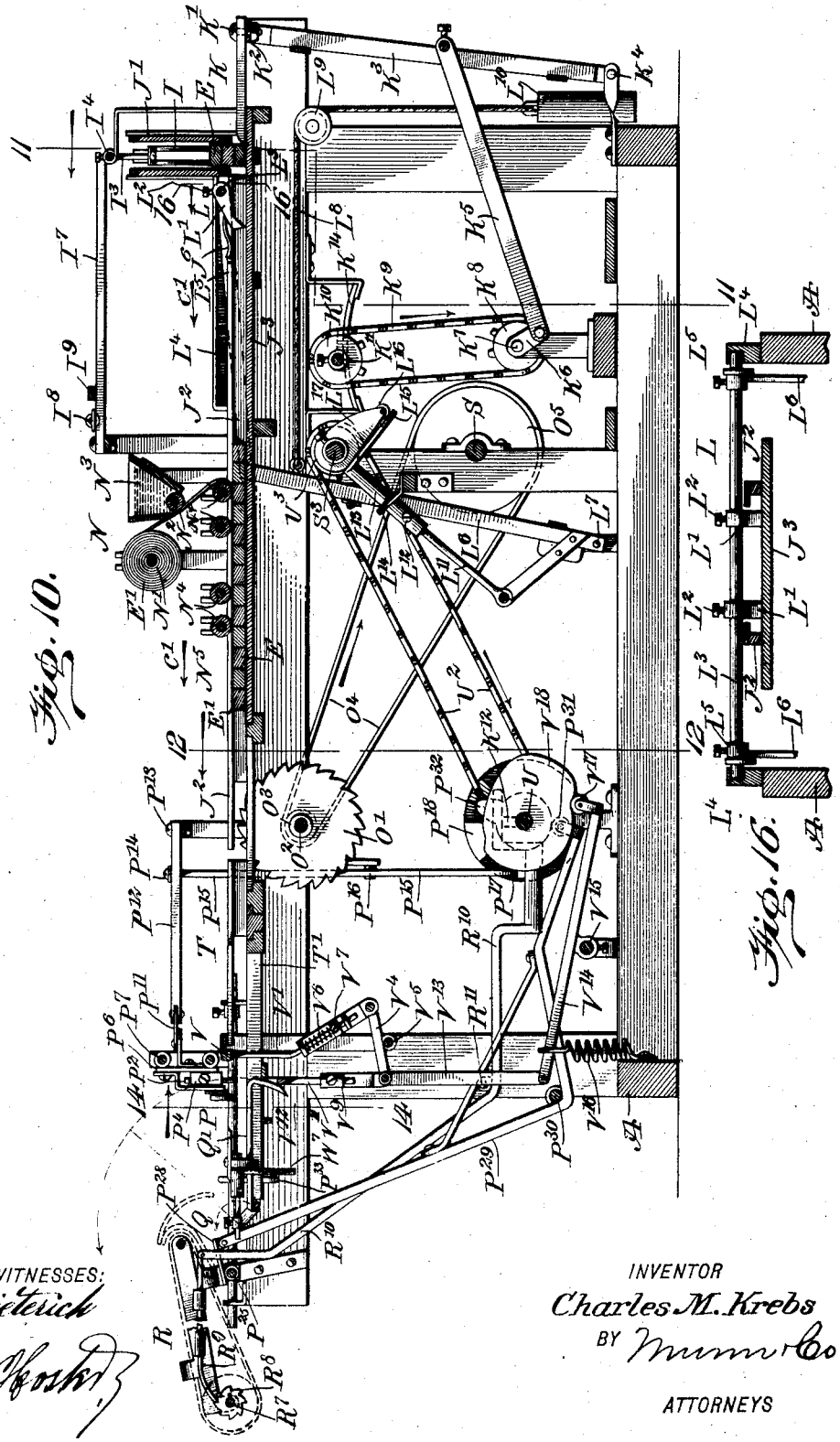
WITNESSES:
INVENTOR  
Charles M. Krebs  
BY  
ATTORNEYS No. 894,017. PATENTED JULY 21, 1908.
C. M. KREBS.
MACHINE FOR MAKING WOOD CARPET SQUARES.
APPLICATION FILED MAY 21, 1906.

10 SHEETS—SHEET 7.

WITNESSES:
H. G. Dieterich

INVENTOR
Charles M. Krebs
BY Munn & Co
ATTORNEYS

No. 894,017. PATENTED JULY 21, 1908.
C. M. KREBS.
MACHINE FOR MAKING WOOD CARPET SQUARES.
APPLICATION FILED MAY 21, 1906.
10 SHEETS—SHEET 8.
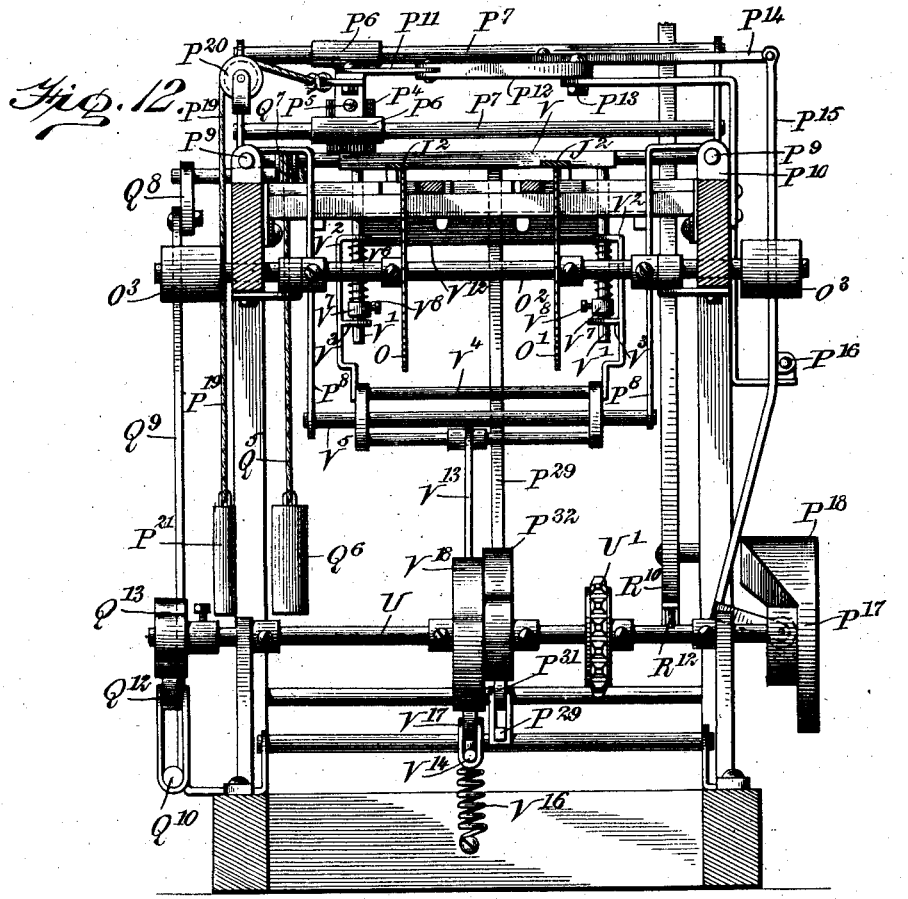
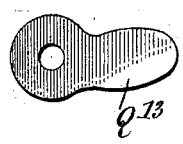 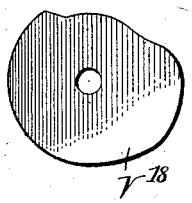 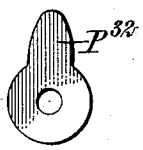 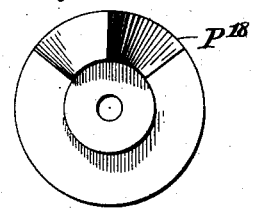
WITNESSES:
INVENTOR
Charles M. Krebs
BY
ATTORNEYS

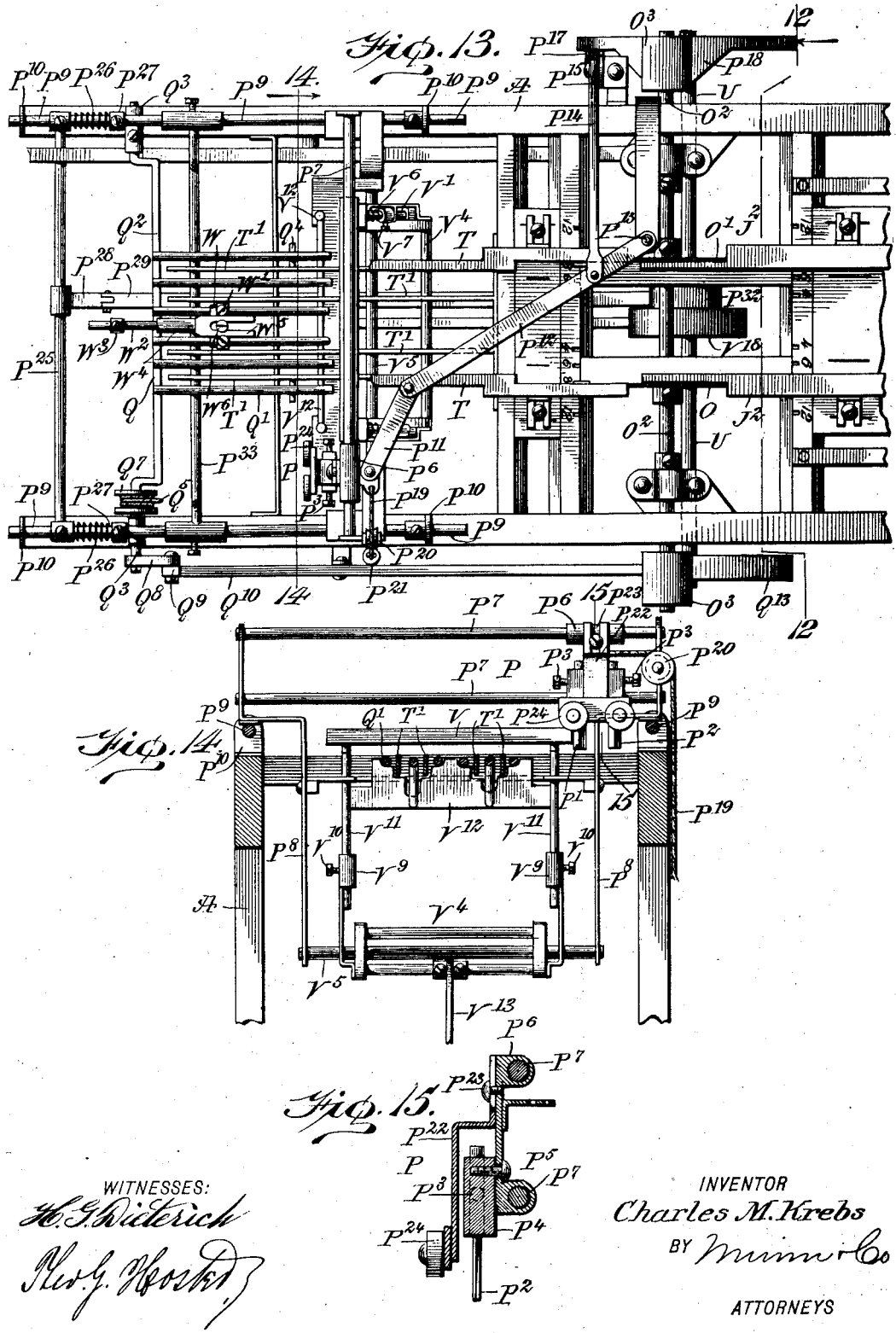
No. 894,017. PATENTED JULY 21, 1908.
C. M. KREBS.
MACHINE FOR MAKING WOOD CARPET SQUARES.
APPLICATION FILED MAY 21, 1906.
10 SHEETS—SHEET 9.
INVENTOR
Charles M. Krebs No. 894,017. PATENTED JULY 21, 1908.
C. M. KREBS.
MACHINE FOR MAKING WOOD CARPET SQUARES.
APPLICATION FILED MAY 21, 1906.
10 SHEETS—SHEET 10.
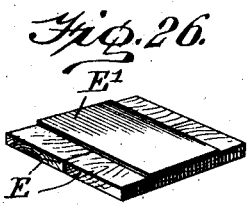
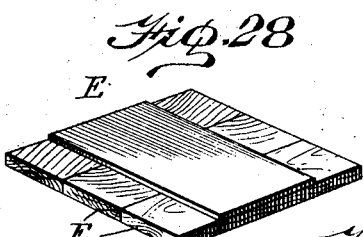
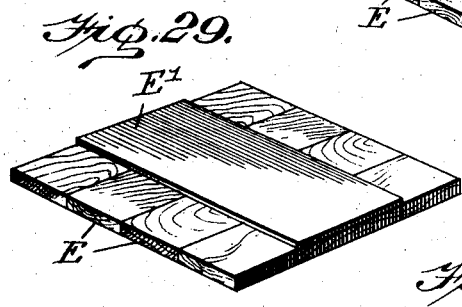
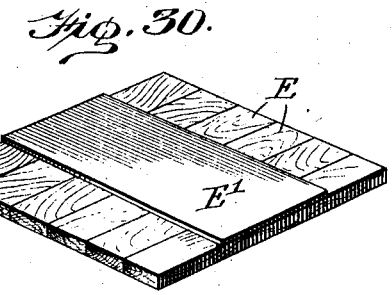
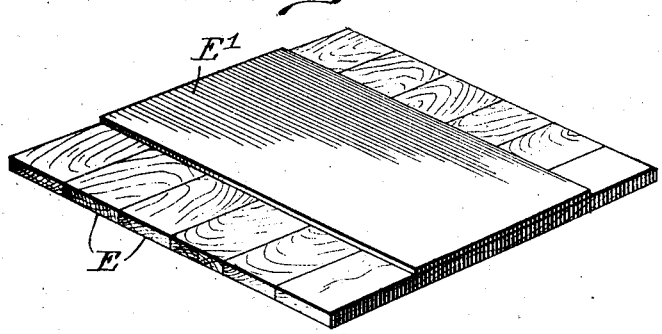
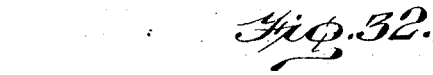
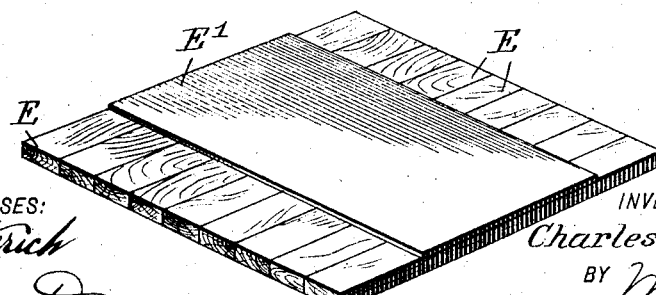
WITNESSES:
H. G. Dieterich
INVENTOR
Charles M. Krebs
BY Munn & Co
ATTORNEYS

UNITED STATES PATENT OFFICE.

CHARLES M. KREBS, OF NEW ALBANY, INDIANA.

MACHINE FOR MAKING WOOD-CARPET SQUARES.

No. 894,017.

Specification of Letters Patent.

Patented July 21, 1908.

Application filed May 21, 1906. Serial No. 317,885.

*To all whom it may concern:*

Be it known that I, CHARLES M. KREBS, a citizen of the United States, and a resident of New Albany, in the county of Floyd and State of Indiana, have invented a new and Improved Machine for Making Wood-Carpet Squares, of which the following is a full, clear, and exact description.

The invention relates to the manufacture of parquetry flooring, and its object is to provide a new and improved machine for making wood carpet squares, each composed of slats of wood laid edge to edge and glued onto a web of fabric material, such as canvas or paper, the slats for each square being formed from a single strip of wood of the proper length and width; and the machine being arranged to successively feed such strips of wood to saws for cutting each strip of wood into a plurality of slats of approximately the desired length, to stack the slats cut from one strip, to trim the side edges of the stacked slats, to feed the same to an assembling device for the latter to arrange the slats edgewise one alongside the other, to glue the uniting web to the assembled slats for forming a continuous piece of wood carpet, to cut the uniting web to form individual squares, and to stack the same for final removal.

Figure 17:
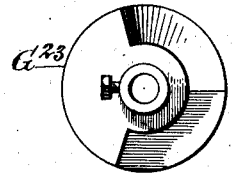
Figure 18:
Figures 19, 20:
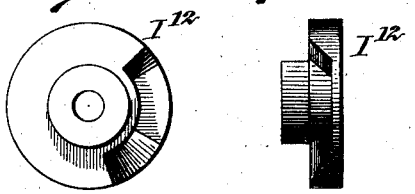

The invention consists of novel features and parts and combinations of the same which will be more fully described hereinafter and then pointed out in the claims.
A practical embodiment of the invention is represented in the accompanying drawings forming a part of this specification, in which similar characters of reference indicate corresponding parts in all the views.
Figure 1 is a plan view of the improvement; Fig. 2 is an enlarged side elevation of the same; Fig. 3 is an enlarged front end view of the same; Fig. 4 is an enlarged sectional side elevation of the improvement, on the lines 4—4 of Figs. 1 and 3; Fig. 5 is an enlarged cross section of the improvement, on the lines 5—5 of Figs. 2 and 4; Fig. 6 is an enlarged plan view of the stacking device and the means for setting the saws and stackers to different lengths of slats; Fig. 7 is a sectional elevation of the stacker, on the line 7—7 of Fig. 6; Fig. 8 is a front elevation of the adjustable reciprocating pusher for feeding the strips of wood to the saws and stacker; Fig. 9 is an enlarged sectional front elevation of the lower part of the hopper and the means for setting the saws to cut a strip to the desired number of slats; Fig. 10 is an enlarged sectional side elevation of the assembling device for the slats, the means for gluing the uniting web onto the assembled slats to form a continuous piece of parquetry flooring, the cutting mechanism for cutting the continuous piece of parquetry flooring into squares, and the discharging device for discharging the finished squares, the section being on the lines 10—10 of Figs. 1 and 3; Fig. 11 is an enlarged transverse section of the assembling device, the section being on the line 11—11 of Fig. 10; Fig. 12 is an enlarged transverse section of the cutting device for cutting the continuous piece of parquetry flooring into squares, the section being on the lines 12—12 of Figs. 10 and 13; Fig. 13 is an enlarged plan view of the cutting device and the discharging device for discharging and stacking the finished squares; Fig. 14 is a transverse section of the same, on the lines 14—14 of Figs. 10 and 13; Fig. 15 is an enlarged sectional side elevation of the cutting device, the section being on the line 15—15 of Fig. 14; Fig. 16 is a transverse section of part of the assembling device, the section being on the line 16—16 of Fig. 10; Fig. 17 is a face view of the cam for actuating the stackers; Fig. 18 is a side elevation of the same; Fig. 19 is a face view of the cam for actuating the feeding device used for carrying the stacked slats from the stacker to the assembling device; Fig. 20 is a side elevation of the same; Fig. 21 is a face view of the cam for actuating the fly of the discharging device for the finished squares; Fig. 22 is a like view of the cam for actuating the holding device for holding one end of the piece of continuous parquetry flooring while cutting the same, and for operating the breaking device for breaking off the square after being cut by the cutting device; Fig. 23 is a face view of the cam for shifting the cutting device bodily; Fig. 24 is a face view of the cam for actuating the cutting device; Fig. 25 is a side elevation of a modified form of pusher for pushing two strips at a time out of the hopper; and Figs. 26 to 32 are perspective views of different squares made by the machine.

The improved machine is mounted on a suitably constructed frame A supporting, at its front end, a hopper B for containing a pile of strips of wood, of which the lowermost strip rests on a platform C and is adapted to be cut by spaced circular saws D into the number of slats E required for one wood carpet square, such as shown in Figs. 26 to 32. The several slats cut out of one strip are transferred in the direction of the arrow $a'$ by the use of a reciprocating transferring device F, to a stacker G arranged transversely on the frame A and having rocking arms $G^7$ operating in the bottom of a transfer duct or guideway $G^2$, the said rocking arms $G'$ being adapted to incline the slats one in front of the other. An endless carrier $G^3$ in the form of a chain has its upper run traveling a distance below and in alinement with the bottom of the guideway $G^2$, and on this carrier are secured, at intervals, arms $G^4$ adapted to successively engage the ends of the inclined slats to push the same along in the guideway $G^2$ in the direction of the arrow $b'$; and as the slats are inclined as above described, it is evident that the slats are pushed one on top of the other to form a pile of the slats required for one wood carpet square. While the slats are stacked and carried along in the guideway $G^2$ in the direction of the arrow $b'$, the side edges thereof are trimmed by vertically-disposed revolving cutter heads H and $H'$, and the trimmed pile of slats is finally engaged by a pusher I which pushes the slats into a hopper $J'$ forming part of an assembling device J having a longitudinally reciprocating pushing device K for engaging the outer side of the lowermost slat in the hopper $J'$, to push the slats successively sidewise out of the hopper $J'$ and into the guideways $J^2$ adjustably secured to the top of a table $J^3$ held on the frame A and supporting the slats. The slats are thus arranged edgewise one alongside the other, and the slats for one square are moved over the table $J^3$ in the direction of the arrow $c'$ by a pushing device L, so that the slats finally pass under the web-attaching device N for gluing or pasting a web $E'$ of paper or like fabric material onto the upper faces of the slats, it being understood that the pushing device now ranges side by side all the slats cut from the successive strips in the hopper B, so that when the web $E'$ is secured to the slats, a continuous piece of wood carpet is formed. The piece of wood carpet thus produced is now trimmed at the ends of the slats by circular trimming saws O and $O'$, after which the trimmed piece of wood carpet is cut transversely at the web $E'$ by a cutting device P to form the individual squares in such a manner that only the slats from one strip are contained in the square. A transferring device Q now successively transfers the finished squares to a buncher or stacker R, from which the squares are periodically removed.

The detailed construction of the several devices above described is as follows: The hopper B is preferably in the form of an open slat-work (see Figs. 1, 2, 3 and 4), and its front side $B'$ is made adjustable toward and from the rear side $B^2$, to accommodate strips of wood of different widths. The rear side $B^2$ and the ends $B^3$ and $B^4$ of the hopper are fixed on the frame A, and the front side $B'$ is provided with transverse bars $B^5$ fitted to slide in recesses $B^6$ formed in the ends $B^3$ and $B^4$, as indicated in Fig. 2. Each of the transverse bars $B^5$ is provided, at its ends, with slotted arms $B^7$ engaged by screws $B^8$ screwing in the ends $B^3$ and $B^4$ and serving to lock the side $B'$ in position after the desired adjustment is made to accommodate strips of wood of a desired width. In order to accommodate strips of wood of different length in the hopper B, the latter is provided with auxiliary ends $B^9$ and $B^{10}$ arranged inside the hopper adjacent to the corresponding ends $B^3$ and $B^4$. The auxiliary ends $B^9$ and $B^{10}$ are adjustable toward and from each other to accommodate strips of wood of a desired length. The tops of the ends $B^9$ and $B^{10}$ are provided with arms $B^{12}$ adjustably held on a transverse bar $B^{13}$ attached to the top of the ends $B^3$ and $B^4$, and the said arms $B^{12}$ are adapted to be fastened to the bar $B^{13}$ by screws $B^{14}$ after the auxiliary ends $B^9$ and $B^{10}$ have been adjusted to the desired position. The auxiliary ends $B^9$ and $B^{10}$ are strengthened or stiffened about midway of their height by arms $B^{15}$ adjustably secured on a bar $B^{16}$ attached to the ends $B^3$ and $B^4$ at the rear of the rear side $B^2$, the said arms slidably engaging pins $B^{17}$ secured to the said ends $B^9$ and $B^{10}$ and projecting outwardly therefrom. The auxiliary ends $B^9$ and $B^{10}$ can thus be readily adjusted toward or from each other and securely held in place by the arms $B^{12}$ and $B^{15}$. The arms $B^{12}$ and $B^{15}$ can be readily inserted through the open rear side $B^2$ of the hopper B and engaged with the pins $B^{17}$.

From the foregoing it will be seen that by the construction of the hopper described and shown, strips of wood of a desired length and width can be readily accommodated in the hopper B by making the adjustments above described.

The platform or support C shown more particularly in Figs. 4 and 6, consists essentially of transverse beams $C'$ and $C^2$ secured to the frame A and connected with each other by longitudinal beams $C^3$. The longitudinal beams $C^3$ are provided with slots or recesses $C^4$ for the passage of the saws D employed for cutting the bottom strip of wood into a predetermined number of slats, the positions of the said beams $C^3$ determining the positions of the saws D. Each longitudinal beam $C^3$ is provided, at its ends, with projecting pins or plates $C^5$ engaging recesses $C^6$ formed in the transverse beams $C'$ and $C^2$. By the arrangement described the longitudinal beams $C^3$ can be readily adjusted toward and from each other, according to the number of slats to be cut from the single bottom strip of wood of the pile of strips contained in the hopper B, the recesses $C^6$ being correspondingly marked with numerals, giving the size of the square to be made, as plainly shown in Fig. 6, to permit the operator to readily adjust the longitudinal beams $C^3$ according to the number of slats to be cut from the bottom strip and required for forming a square of the corresponding size. It is understood that more or less of the longitudinal beams $C^3$ are used, according to the number of slats required for a square. On top of each beam $C^3$ is arranged a longitudinal guide strip $C^7$ (see Figs. 4 and 6) extending from the forward end of the slot $C^4$ up to the stacking device G to keep the several slats cut off by the saws D separate during their travel over the platform C to the stacker G.

The circular saws D are adjustably secured, by set-screws or other means $D'$, on an arbor $D^2$, provided at its ends with pulleys $D^3$ connected by belts $D^4$ with pulleys $D^5$ secured on the transversely-extending main driving shaft S, journaled on the main frame A and provided with a pulley $S'$ connected by belt with other machinery for imparting a rotary motion to the said main driving shaft S. Thus when the machine is in operation and the main driving shaft S is rotated, then a rotary motion is transmitted to the arbor $D^2$ by the pulleys $D^5$ and $D^3$ and the belt $D^4$, so that the saws D are simultaneously rotated in the direction of the arrow $d'$ (see Fig. 4). The arbor $D^2$ is journaled in bearings $D^6$ mounted to slide up and down in slightly inclined guideways $D^7$ attached to the main frame A, and the said bearings $D^6$ are pivotally connected by links $D^8$ with a crank arm $D^9$ secured on a shaft $D^{10}$ journaled in suitable bearings attached to the main frame A. Now, when the machine is in operation a rotary motion is given to the shaft $D^{10}$, so that the crank arms $D^9$ thereof and the links $D^8$ impart an up and down sliding motion to the bearings $D^6$, so as to bring the circular saws D in engagement with the under side of the lowermost strip of wood in the hopper B, to cut the said strip into the desired number of slats. As soon as the strip is cut into slats, the arbor $D^2$ is lowered by the arrangement described, so that the saws D move into a lowermost position; that is, a distance below the platform or support C. The saws D, in rising, pass through the slots or recesses $C^4$ formed in the longitudinal beams $C^3$, as previously explained, to permit the saws to readily cut the lowermost strip of wood from underneath. The guideways $D^7$ are slightly inclined to bring the tops of the saws D first in engagement with the forward corner of the lowermost strip, so as to insure proper cutting of the strip into slats.

The crank shaft $D^{10}$ is driven from a cam shaft $S^2$, which in turn is driven from another cam shaft $S^3$ (see Fig. 4), both the cam shafts extending transversely and being journaled on the main frame A. The cam shaft $S^3$ is rotated from the main shaft S, and for this purpose the crank shaft $D^{10}$ is provided with a pulley $S^4$ connected by a sprocket chain $S^5$ with a sprocket wheel $S^6$ secured on the cam shaft $S^2$. On this cam shaft $S^2$ is secured a sprocket wheel $S^7$ (see Fig. 3) connected by a sprocket chain $S^8$ with a sprocket wheel $S^9$ attached to the cam shaft $S^3$, on which is secured a pulley $S^{10}$ (see Fig. 1) connected by a belt $S^{11}$ with a pulley $S^{12}$ secured on a counter-shaft $S^{13}$ journaled on the main frame A and provided with a pulley $S^{14}$ connected by a belt $S^{15}$ with another counter-shaft $S^{17}$ likewise journaled on the main frame A and provided with a cone pulley $S^{18}$ connected by a belt $S^{19}$ with a cone pulley $S^{20}$ secured to the main shaft S (see Figs. 1 and 3). Now, when the main shaft S is rotated, a rotary motion is transmitted by the devices above described to the cam shafts $S^3$ and $S^2$ and the crank shaft $D^{10}$, of which the cam shaft $S^2$ actuates the reciprocating transferring device F in a manner presently to be described.

The transferring device F (see Figs. 1, 3, 4 and 8) is provided with a plurality of arms $F'$ extending longitudinally and arranged in pairs, except the outermost arms, which are single, as plainly indicated in Figs. 1 and 8. The arms $F'$ are provided, at their outer ends, with heads $F^2$ adjustably attached by clamping bolts $F^3$ to a slotted transverse slide $F^4$, mounted to slide at its ends in suitable guideways $F^5$ attached to the frame A. The arms $F'$ pass between friction rollers $F^6$ and $F^7$ journaled in brackets $F^8$ attached to the main frame A adjacent to the front end of the platform C, and the said arms $F'$ overlie the longitudinal beams $C^3$ of the said platform C. The heads $F^2$ are adjustable on the slide $F^4$, to permit of bringing the arms in proper alinement with the beams $C^3$ when the latter are adjusted to different lengths of strips of wood, as previously explained; and in order to guide the operator to make a proper adjustment of the heads $F^2$ on the slide $F^4$, the latter is provided with graduation marks (see Fig. 8) similar to the ones at the recesses $C^6$ previously mentioned and shown in Fig. 6. The slide $F^4$ is pivotally connected by links $F^9$ with a rock frame $F^{10}$ fulcrumed at its lower end, at $F^{11}$, on the main frame A, and the said rock frame $F^{10}$ is connected by pitmen $F^{12}$ with crank arms $F^{13}$ on the shaft $S^2$, so that when the latter is rotated, a reciprocating movement is given to the slide $F^4$ and the arms $F'$ thereof, to push the slats cut by the saws D away from the bottom of the hopper B and over the platform C into the guideway or duct $G^2$ of the stacker G. The arms $F'$ are guided in fork-shaped guideways $F^{14}$ depending from and held adjustable by set-screws $F^{15}$ on a transverse bar $F^{16}$ attached to the front side $B'$ of the hopper B, as plainly indicated in Fig. 9. Each guideway $F^{14}$ is set on a graduation, indicated on the lower end of the front side $B'$, to adjust the guideways corresponding to the arms $F'$ and the longitudinal beams $C^3$, as previously described. The inner faces of the guideways $F^{14}$ are flush with the inner face of the front side $B'$, so that the strips contained in the hopper B are properly guided down onto the arms $F'$, and the slats cut from the lowermost strip are properly guided down onto the platform C at the time the arms $F'$ move into their outermost position and out from under the slats, so that the slats are now engaged at their front edges by the inner ends of the arms $F'$. Now, when the machine is in motion and the arms $F'$ move inward in the direction of the arrow $a'$ after the saws D have cut the lowermost strip into slats, and the saws D have moved back in the lowermost position, then the slats are pushed over the platform C into the guideway or duct $G^2$.

The lower end of the hopper B is closed at the rear side $B^2$ by a gate $B^{18}$ adapted to be raised and lowered periodically, the gate, when lowered, confining the lowermost strip in position during the sawing operation, in connection with the guideways $F^{14}$, and immediately previous to pushing the slats, by the arms $F'$, out from under the next lowermost strip of wood, the gate $B^{18}$ is raised for the time being. The gate $B^{18}$ is shown more fully in detail in Fig. 5, and is mounted to slide up and down in suitable guideways $B^{19}$ formed in the ends $B^3$ and $B^4$ of the hopper B. The gate $B^{18}$ is provided, at its bottom, with a transversely-extending bar $B^{20}$, on which are adjustably secured depending arms $B^{21}$ arranged in alinement with the arms $F'$ of the transferring device F, the lower ends of the said arms normally resting on the beams $C^3$ in front of the inner rear edges of the slats. In order to periodically raise and lower the gate $B^{18}$, the ends thereof are pivotally connected by links $B^{22}$ with levers $B^{23}$ fulcrumed at $B^{24}$ on the main frame A and engaging with their rear ends the peripheral surfaces of cams $B^{25}$ secured on the cam shaft $S^3$ and having cut-out portions $B^{26}$, so that when the ends of the levers $B^{23}$ drop into the cut-out portions $B^{26}$, then the gate $B^{18}$ drops; and when the cams $B^{25}$ rotate, they impart a swinging motion to the levers $B^{23}$, to raise the gate $B^{18}$ during the time the slats are transferred from the bottom of the hopper B to the guideway $G^2$. The lower ends of the links $B^{22}$ are provided with slots $B^{27}$, through which extend pins $B^{28}$ attached to the gate $B^{18}$, so that the levers $B^{23}$, when moving with their inner ends out of the cut-out portions $B^{26}$, swing easily at the beginning until the bottoms of the slots $B^{27}$ reach the pins $B^{28}$, to then lift the gate $B^{18}$. The connection of the links $B^{22}$ with the lever $B^{23}$ is adjustable, by providing the links with rows of apertures $B^{29}$ for engagement by pins $B^{30}$ on the ends of the levers $B^{23}$. By this arrangement the gate $B^{18}$ may be raised more or less, according to the number of superimposed strips of wood cut at the time into slats in the hopper B. Weighted arms $B^{31}$ are fulcrumed in pairs on opposite sides of the beams $C^3$ (see Figs. 4 and 5), and the forward ends of the said arms extend into the bottom of the hopper B to engage the under side of the lowermost strip of wood and to press upward on the same, thus steadying the descent of the entire pile of strips of wood after the slats are pushed out from under the lowermost strip by the arms $F'$ and the latter have moved forward out from under the hopper B.

In order to pass the slats into the guideway $G^2$ of the stacker G, it is necessary to raise that portion $G^5$ of the front side of the guideway $G^2$ located adjacent to the rear end of the platform C, and for this purpose the following arrangement is made, special reference being had to Figs. 1, 2 and 4: The side portion $G^5$ is provided with forwardly-projecting arms $G^6$, connected with levers $G^7$ fulcrumed at $G^8$ on the main frame A, and from the fulcrum $G^8$ depends an arm $G^9$ carrying a weight $G^{10}$ and a friction roller $G^{11}$ traveling on the peripheral surface of a cam $G^{12}$ secured on the cam shaft $S^2$, previously mentioned. Now, when the machine is running, the side portion $G^5$ is normally in a closed position until the slats are transferred from the hopper B to the guideway $G^2$ by the transferring device F, and immediately previous to the slats reaching the portion $G^5$, the latter is pulled forwardly by the action of the cam $G^{12}$ on the arm $G^9$, levers $G^7$ and arms $G^6$, and the said portion $G^5$, in traveling forwardly—that is, in the inverse direction of the arrow $a'$—travels up inclined surfaces $G^{13}$ attached to the top of the frame A immediately in front of the portion $G^5$. Thus, when the slats are pushed rearward, they pass under the portion $G^5$ now raised so that the slats pass directly onto the rocking arms $G'$, normally in a horizontal position and flush, at their top faces, with the top face of the platform C. As soon as the slats have been pushed onto the rocking arms $G'$ and the transferring device F is on the return or outward stroke, then the cam $G^{12}$ acting on the arm $G^9$, causes the levers $G^7$ and arms $G^6$ to return the portion $G^5$, to again close the guideway $G^2$.

The detailed construction of the stacker G is as follows, special reference being had to Figs. 1, 4, 6 and 7: The rocking arms $G'$ are arranged in pairs and provided with trunnions $G^{14}$ removably fulcrumed in notches $G^{16}$ formed on the top of a transversely-slotted bottom $G^{15}$ secured on the main frame A and forming, with the pairs of rocking arms $G'$, a slot or passage for the arms $G^4$, previously referred to and employed for moving the slats one on top of the other and bodily along in the guideway $G^2$. Each pair of rocking arms $G'$ is provided with a depending and approximately U-shaped arm $G^{17}$ engaging, with its middle portion, one of a set of notches $G^{18}$ formed in the bottom of a link $G^{19}$ connecting the several arms $G^{17}$ with each other, as plainly shown in Fig. 7. One end of the link $G^{19}$ is provided with depending pin $G^{20}$ engaged by one end of a lever $G^{21}$, fulcrumed at $G^{22}$ (see Fig. 1) on the main frame A, and the said lever $G^{21}$ is actuated by a cam $G^{23}$ secured on the cam shaft $S^3$. Thus, when the machine is in operation, the cam $G^{23}$ imparts periodically a swinging motion to the lever $G^{21}$, so as to impart movement to the link $G^{19}$, whereby the several rocking arms $G'$ are rocked, and consequently swung into an inclined position, as indicated in dotted lines in Fig. 7, to bodily move the corresponding slats on the rocking arms into an inclined position. Now, when the several rocking arms $G'$ and their slats are in an inclined position and an arm $G^4$ enters the guideway $G^2$, it successively engages the inclined slats and pushes one on top of the other, so that the slats are stacked at the time the arm $G^4$ leaves the last pair of rocking arms $G'$ of the series. The notches $G^{16}$ in which the trunnions $G^{14}$ are mounted to rock are graduated or numbered to give the size of the squares and to correspond to the notches $C^6$, to permit of using as many pairs of rocking arms $G'$ as there are slats cut from a single strip of wood at the hopper B. By the arrangement described the operator is enabled to quickly change the number and the positions of the rocking arms $G'$, according to the number of slats cut from a single strip of wood at the time for a given sized square and in such manner that one slat is received on each pair of rocking arms $G'$.

In order to accommodate slats of different widths in the guideway $G^2$, the rear side $G^{24}$ (see Fig. 1) of the guideway $G^2$ is made adjustable, and for this purpose is provided with slotted arms $G^{25}$ engaged by screws $G^{26}$, screwing in the main frame A, and allowing adjustment of the rear side $G^{24}$ to give the desired width to the guideway $G^2$, according to the width of the slats. The carrier $G^3$ passes over idlers $G^{27}$, $G^{28}$ and $G^{29}$, and over a sprocket wheel $G^{30}$ (see Fig. 3), of which the idlers are journaled on the main frame A, and the sprocket wheel $G^{30}$ is secured on a longitudinally-extending shaft $G^{31}$ journaled on the main frame A and provided with a bevel gear wheel $G^{32}$ (see Fig. 1), in mesh with a bevel gear wheel $G^{33}$ secured on the cam shaft $S^3$. Thus, when the machine is running a continuous traveling motion is given to the carrier $G^3$, to cause each arm $G^4$ to stack the slats and move the same in a stacked condition bodily along in the guideway $G^2$, as above explained. The stacked slats, after leaving the last pair of rocking arms $G'$, encounter, with their forward ends, a weighted swing gate $G^{34}$, to move the slats with their ends in vertical alinement. The stacked and alined slats now travel through the portion of the guideway $G^2$ extending from the gate $G^{34}$ to the hopper $J'$, and both sides of this portion of the guideway $G^2$ are made in sections and adjustable toward and from each other, the same as the portion $G^{24}$, above described, to accommodate stacks of slats of different widths. The stack of slats, while moved along in this portion of the guideway $G^2$, have their side edges trimmed successively by the cutter heads H and H', located in opposite sides of the guideway, as plainly shown in Fig. 1.

The cutter heads H and H' are of any approved construction, and each has its vertical shaft $H^2$ (see Fig. 3) provided with a pulley $H^3$, connected by a crossed belt $H^4$ (see Fig. 1), with a pulley $H^5$ on the main shaft S. Thus when the latter is rotated a rotary motion is given to the cutter heads H and H' for the latter to turn the side edges of the stack of slats pushed past a cutter head in the guideway $G^2$ by an arm $G^4$ of the endless carrier. The slats of successive stacks are thus all trimmed to the same width, to insure the formation of a uniform product.

The trimmed and stacked slats, when reaching the end of the guideway $G^2$ adjacent to the hopper $J'$, engage the inclined forked end $I'$ of the pusher I (see Figs. 1, 10 and 11), fulcrumed at $I^2$ on a cross head $I^3$ mounted to slide transversely on a guideway $I^4$ carried on the main frame A. A spring $I^5$ held on the guideway $I^4$ forms a cushion for the cross head $I^3$ when the latter reaches its rear end position. The cross head $I^3$ is pivotally connected by a link $I^6$ with a lever $I^7$ fulcrumed on the main frame, and pressed on by a spring $I^8$ and connected by a link $I^9$ with the upper end of a lever $I^{10}$ fulcrumed on the frame A and carrying, at its lower end, a friction roller $I^{11}$ in engagement with a cam $I^{12}$ secured on the cam shaft $S^3$. Thus when the machine is running the cam $I^{12}$ imparts periodically a rocking motion to the lever $I^{10}$, which, by the links $I^9$, imparts a swinging motion to the lever $I^7$, and the latter, by the link $I^6$, causes the cross head $I^3$ to intermittently reciprocate on the guideway $I^4$. Now, when a stack of slats reaches the end of the guideway $G^2$, they engage the inclined forked end $I'$, thus causing the pusher I to swing upward over the top surface of the uppermost slat, to then drop in the rear of the stack of slats just before the time the arm $G^4$ leaves a stack of slats by traveling downward at the sprocket wheel $G^{30}$. The cross head $I^3$ now reciprocates to cause the pusher I to push the stack of slats from the end of the guideway $G^2$ into the hopper $J'$ and against a vertical bar $J^4$, to limit the traveling motion of the stack of slats by the pusher I, which is now at the end of its stroke. The stack of slats now drop down, by their own weight, through the bottom opening $J^5$ of the hopper $J'$ onto the table $J^3$, previously mentioned and forming part of the assembling device J.

The pushing device K for engaging the lowermost slat of the pile or stack of slats in the hopper $J'$ is arranged as follows, special reference being had to Figs. 1, 2, 3, 10 and 11: The pushing device K is preferably in the form of a number of bars arranged one alongside the other and adapted to travel on the top of the table $J^3$, and the said bars are secured, at their outer ends, by bolts $K'$ to a slotted cross bar $K^2$ swiveled on the upper end of a lever $K^3$ fulcrumed at its lower end, at $K^4$, on the main frame A. The lever $K^3$ is connected, by a pitman $K^5$, with the crank arm $K^6$ of a crank shaft $K^7$ extending transversely and journaled in suitable bearings on the main frame A. On the crank shaft $K^7$ is secured a sprocket wheel $K^8$, connected by a sprocket chain $K^9$ with a sprocket wheel $K^{10}$ secured on a transverse shaft $K^{11}$ journaled in suitable bearings $K^{12}$ adjustably secured by bolts $K^{13}$ to segmental guideways $K^{14}$ attached to the main frame A. On the shaft $K^{11}$ is adjustably secured a series of graduated gear wheels $K^{15}$, one of which is adapted to mesh at a time with a gear wheel $K^{16}$ secured on the cam shaft $S^3$. By having the series of gear wheels $K^{15}$ adjustably secured on the shaft $K^{11}$, and the latter mounted in bearings $K^{12}$ adjustable on the guideways $K^{14}$, it is evident that anyone of the gear wheels of the series of gear wheels $K^{15}$ can be moved in mesh with the gear wheel $K^{16}$, according to the number of slats cut from each of the strips of wood contained in the hopper B at the time. Now, when the machine is in operation, the gear wheel $K^{16}$ rotates the corresponding gear wheel of the series of gear wheels $K^{15}$, and hence the shaft $K^{11}$, by the sprocket wheels $K^{10}$ and $K^8$, and the sprocket chain $K^9$, rotates the crank shaft $K^7$ so that the crank arm $K^6$ thereof and the pitman $K^5$ impart a swinging motion to the lever $K^3$, to reciprocate the bars of the pushing device K for the latter to push the lowermost slat out from under the remaining ones, and out of the hopper $J'$ into the guideways $J^2$, previously referred to.

From the foregoing it will be seen that the slats are successively pushed out of the hopper $J'$ by the bars of the pushing device engaging the outer side edge thereof, so that the slats are successively pushed into the guideways $J^2$ and arranged edgewise one alongside the other, as will be readily understood by reference to Fig. 10.

The slats successively moved along by the pushing device K over the table $J^3$ pass under and lift the pusher arms $L'$ of the pushing device L, so that the free ends of the arms $L'$ drop down onto the table at the outer side of the slats, and as the several slats are moved along by the pushing device K to the same place, it is evident that one slat pushes the slat ahead forward until all the slats of the stack contained in the hopper $J'$ have been pushed along and in front of the arms $L'$. In order to prevent a slat from being pushed too far, retaining springs $J^6$ are arranged lengthwise on the guideways $J^2$. When the several slats for a square are ranged on the table $J^3$ in front of the arms $L'$, then a reciprocating motion is given to the pushing device L for pushing the slats along over the table to the web-attaching device N.

The pushing device L is arranged as follows, special reference being had to Figs. 1, 2, 10, 11 and 16: The pusher arms $L'$ are secured, by set-screws $L^2$, on a transversely-extending shaft $L^3$ having its ends extending into longitudinal guideways $L^4$ arranged on the top of the main frame A, to allow the shaft $L^3$ to turn and to move bodily forward and backward in the guideways $L^4$. The shaft $L^3$ is connected by links $L^5$ with a lever $L^6$ fulcrumed at $L^7$ on the main frame A, and the lever $L^6$ is connected at opposite sides with the ends of ropes $L^8$ passing over pulleys $L^9$ journaled on the frame A, the said ropes $L^8$ being provided with weights $L^{10}$ to normally hold the lever $L^6$, and consequently the shaft $L^3$ and arms $L'$, in the receiving position shown in Fig. 10. The lever $L^6$ is also pivotally connected with a rod $L^{11}$, on which is adjustably secured by a set-screw $L^{12}$, a sleeve or extension $L^{13}$, mounted to slide in a bearing $L^{14}$ and having a plate $L^{15}$ adapted to be engaged by a friction roller $L^{16}$ journaled on a cam arm $L^{17}$ secured on the cam shaft $S^3$. Now, when the several parts are in the position as shown in Fig. 10 and the machine is in operation, and the set of slats for a square are in front of the pusher arms $L'$, then the cam arm $L^{17}$ acts, by its friction roller $L^{16}$, on the plate $L^{15}$, to impart sliding motion to the sleeve $L^{13}$ and its rod $L^{11}$, so that a swinging motion is given to the lever $L^6$, which, by the links $L^5$, imparts a traveling motion to the shaft $L^3$ in the direction of the arrow $c'$, to cause the pusher arms $L'$ to push the set of slats in front of the said arms to the web-attaching device N. When the friction roller $L^{16}$ leaves the plate $L^{15}$ at the end of the stroke of the shaft $L^3$, then the weights $L^{10}$ cause the pushing device L to return to its former position for receiving the next set of slats for another square.

The web-attaching device N, shown more fully in Figs. 1, 2 and 10, is arranged as follows: The web E' of paper or like fabric material is arranged in a roll on a core N', removably held in bearings attached to the main frame A; and the web unwinding from the roll passes under a pasting roller $N^2$ journaled in the bottom of a box $N^3$ containing glue, paste or other suitable adhesive material, so that the top face of the web, as it passes under the roller N', is supplied with the adhesive substance. The web, after leaving the roll $N^2$, passes under a number of presser rollers $N^4$ journaled on the main frame A and extending transversely across the top of the slats E, so that the web E' passes, with its coated face, onto the top of the slats E, and as the slats are pushed along the web E' is unrolled from its roll and drawn along, together with the slats, so that the several slats are united with each other by the web E'. In order to insure a rapid drying of the adhesive substance on the web E' connecting the slats E with each other, a drying coil $N^5$ is provided, extending across the top of the web in the rear of the last roller $N^4$, as indicated in Fig. 2.

Now it is evident that the pusher arms L' of the pushing device L, in pushing the sets of slats along to the web-attaching device N and under the rollers $N^4$, causes the connected or united slats to travel onward in the direction of the arrow c', so that all the slats are united with each other, to form a continuous piece of parquetry flooring.

The ends of the slats forming the continuous piece of parquetry flooring are now trimmed by circular saws O and O' extending up at the cut-out portions of the guideways $J^2$, so that the continuous piece of parquetry flooring is rendered uniform in its width throughout. The circular saws O and O' are adjustably secured on an arbor $O^2$ journaled in suitable bearings on the main frame A, and on the said arbor $O^2$ are secured pulleys $O^3$ connected by belts $O^4$ with pulleys $O^5$ secured to the main shaft S, so that when the machine is running a rotary motion is given to the circular saws O and O' for the latter to trim the ends of the slats as the piece of parquetry flooring moves along, as before stated.

The piece of parquetry flooring, after leaving the circular saws O and O', passes into an adjustable guideway T which forms an extension of the guideway $J^2$, and is provided with a bottom T', preferably in slat form, and which is an extension or continuation of the table $J^3$ and is projected rearwardly beyond the guideway T and the cutting device P, almost to the end of the fly Q, as plainly shown in Figs. 10 and 13.

The parquetry flooring, during a period of rest on the bottom T', is acted on by the knives P' and $P^2$ of the cutting device P, serving to cut the web E' in a transverse direction and at the end of a square; that is, at the outer edge of the last slat belonging to a square, so that the same slats cut from a strip of wood and united by the web E' form an individual square.

The cutting device P is arranged as follows, special reference being had to Figs. 2, 12, 13, 14 and 15: The knives P' and $P^2$ are adjustably secured, by set-screws $P^3$, in a block $P^4$ mounted to swing on a pivot $P^5$ held on a cross head $P^6$, mounted to slide on transverse guideways $P^7$ secured to and forming part of a frame $P^8$ mounted to slide lengthwise, and having for this purpose longitudinal bars $P^9$ mounted to slide lengthwise in bearings $P^{10}$ attached to the frame A. The cross head $P^6$ is pivotally connected by a link $P^{11}$ with a lever $P^{12}$ fulcrumed at $P^{13}$ on the main frame A, and connected by a link $P^{14}$ with a lever $P^{15}$ fulcrumed at $P^{16}$ on the main frame (see Fig. 12); and the lower end of this lever $P^{15}$ is provided with a friction roller $P^{17}$ in engagement with a cam $P^{18}$ attached to one end of a shaft U extending transversely and journaled in suitable bearings arranged on the main frame A. A rotary motion is given to this shaft U from the cam shaft $S^3$, and for this purpose the shaft U is provided with a sprocket wheel U', connected by a sprocket chain $U^2$ with a sprocket wheel $U^3$ secured on the cam shaft $S^3$, as plainly shown in Fig. 10. The cross head $P^6$ is also connected with one end by a rope $P^{19}$ extending over a pulley $P^{20}$ and carrying, on its depending end, a weight $P^{21}$ for normally holding the cross head $P^6$ in a dormant position to one side of the frame A, as plainly shown in Figs. 12, 13 and 14.

Now, when the machine is running and the piece of parquetry flooring is at rest on the bottom T', then the cam $P^{18}$ imparts a swinging motion to the lever $P^{15}$, which, by the link $P^{14}$, lever $P^{12}$ and link $P^{11}$, imparts a transverse sliding motion to the cross head $P^6$, so that the knives P' and $P^2$ are moved transversely and the cutting edge of the knife P' cuts the web E' during this transverse movement of the cross head $P^6$, which is immediately returned, by the action of the weight $P^{21}$ and rope $P^{19}$, so that on the return stroke the other knife $P^2$ again acts on the web E', to completely sever the same, to separate a square from the continuous piece of parquetry flooring.

It is understood that when the cross head $P^6$ slides transversely across the knives P' and $P^2$, they assume an inclined position, so that on going over the knife P' cuts, and during the return stroke the knife $P^2$ does the cutting. By this arrangement a complete cutting of the web E' is insured.

In order to hold the square in the rear of the knives P' and $P^2$ down on the bottom T' during the cutting operation, and to hold the web down so that the knives will not scrape it out of place if the web is not thoroughly dry, the following arrangement is made: A bracket $P^{22}$ is adjustably secured by a set-screw $P^{23}$ to the cross head $P^6$, and on the lower end of the bracket $P^{22}$ are journaled friction rollers $P^{24}$ for engaging the top of the square during the transverse movement of the cross head $P^6$; that is, during the cutting operation.

In order to hold the continuous piece of parquetry flooring down on the bottom $T'$ adjacent to the knives $P'$ and $P^2$, the following device is provided: A transverse bar V is adapted to be moved down upon the continuous piece of parquetry flooring as soon as the same comes to rest, and this bar V is provided with downwardly-extending rods $V'$ (see Fig. 12), mounted to slide in bearings $V^2$, $V^3$ held on a rock frame $V^4$ having its shaft $V^5$ mounted to rock on the frame $P^8$. A spring $V^6$ is coiled on each rod $V'$ and rests, at one end, against the bearing $V^2$, and at its other end on a collar $V^7$ adjustably secured, by a set-screw $V^8$, on the corresponding rod $V'$. The rock frame $V^4$ is provided, at its opposite side, with bearings $V^9$ (see Fig. 14), in which are adjustably secured, by set-screws $V^{10}$, rods $V^{11}$ supporting a plate $V^{12}$ extending under the bars $Q'$ of the fly, and also under the slats of the bottom $T'$, as will be readily understood by reference to Fig. 14, the top of the bar $V^{12}$ being cut out correspondingly, to make room for the said bars $Q'$ and the slats of the bottom $T'$. The rock frame $V^4$ is pivotally connected by a link $V^{13}$ (see Fig. 10) with a lever $V^{14}$, fulcrumed at $V^{15}$ on the main frame and pressed on, at one end, by a spring $V^{16}$, and carrying at its other end, a friction roller $V^{17}$ in peripheral contact with a cam $V^{18}$ secured on the shaft U. The cam $V^{18}$ is so shaped that when the machine is in operation, it acts on the lever $V^{14}$ in such a manner that the link $V^{13}$ rocks the rock frame $V^4$, to cause the bearings $V^2$ to press on the springs $V^6$ so as to draw the rods $V'$, and consequently the bar V, yieldingly downward to engage the bar with the top face of the piece of parquetry flooring. At the same time the rock frame $V^4$, by the bearings $V^9$ and rods $V^{11}$, lifts the plate $V^{12}$ but a short distance, and after the web $E'$ is cut by the knives $P'$ and $P^2$ and the cross head $P^6$ has returned to its normal, dormant position, then the cam $V^{18}$ gives a further swinging motion to the lever $V^{14}$, so that the bar V is pressed still more firmly in contact with the piece of parquetry flooring, and at the same time the plate $V^{12}$ is raised, to lift the fly rods $Q'$ and to engage the under side of the cut-off square, to press the same upward adjacent to the cut made by the knives $P'$ and $P^2$, so that, in case the knives have not completely severed the web $E'$, then this upward pressure of the square by the plate $V^{12}$, causes a final breaking of the web $E'$, to insure complete separation of the square from the piece of parquetry flooring.

The rods $Q'$ of the fly Q are secured, at their rear ends, on a crank shaft $Q^2$ journaled in suitable bearings $Q^3$ attached to the rod $P^9$ of the frame $P^8$, and the fly Q, when in a normal lowermost position, has its side rods $Q'$ resting on stop pins $Q^4$ attached to the outermost slats of the bottom $T'$ (see Fig. 13). The fly is normally held in a lowermost position by the action of a rope $Q^5$ carrying a weight $Q^6$ and winding on a drum $Q^7$ secured to the shaft $Q^2$. In order to impart a swinging motion to the fly Q, one end of the shaft $Q^2$ is provided with an arm $Q^8$, connected by a link $Q^9$ with a lever $Q^{10}$ fulcrumed at $Q^{11}$ on the main frame A and carrying a friction roller $Q^{12}$ in peripheral contact with a cam $Q^{13}$ secured on the shaft U. Thus, when the machine is in operation, the cam $Q^{13}$ acts at the proper time on the lever $Q^{10}$, to impart a turning motion to the shaft $Q^2$, so that the fly Q swings around and carries the square along, to deliver it to the buncher R. After the square has been delivered, the fly Q immediately returns to its normal position by the action of the weight $Q^6$ held on the rope $Q^5$ engaging the drum $Q^7$.

In order to bring the cutting-off mechanism attached to the sliding rods $P^9$ into proper adjustment relative to the position of the square to be cut off, and to limit the rearward movement of the piece of parquetry flooring over the rod $Q'$ of the fly Q, a stop block W is provided, adjustably secured by set-screws $W'$ to some of the rods $Q'$, as plainly indicated in Fig. 13. The distance the block W is adjusted from the path of the knives $P'$ and $P^2$, corresponds to the length of the square to be cut off from the piece of parquetry flooring. The frame $P^8$ is adapted to be shifted and for this purpose the rods $P^9$ of the said frame $P^8$ are slidably engaged by a cross bar $P^{25}$ pressed on by springs $P^{26}$ coiled on the rods $P^9$ (see Fig. 13) and resting on collars $P^{27}$ adjustably secured on the rods $P^9$. The cross bar $P^{25}$ is pivotally connected by a link $P^{28}$ with a lever $P^{29}$ (see Fig. 10) fulcrumed at $P^{30}$ on the main frame A and carrying a friction roller $P^{31}$ in peripheral contact with a cam $P^{32}$ secured on the shaft U, previously referred to. The reason for hanging the cutting-off mechanism on the sliding rods $P^9$ is that the width of the slats passing through the machine may not at any one time be all absolutely uniform, and any variation in the width, though very slight in each, may in the whole number of slats contained in the guide-ways $J^2$ between the pusher arm $L'$ when at their most rearwardly position and the stop block W, aggregate enough to make it necessary that the stop block W shall yield to accommodate itself to the point at which the rearward edge of the most rearward slat comes when the whole line of wood carpet is pressed back by the pusher arms L'. At the same time fixed relative positions must be maintained between the different parts of the cutting-off mechanism itself. So the stop block W is made to yield as above referred to by movement of the rods $P^9$, which carry the stop block W back and also the other cutting-off mechanism, without changing their positions in relation to each other. The rods $P^9$ with the mechanism attached to them are moved to their most forwardly position by the cam $P^{32}$ and the lever $P^{29}$ and connections, immediately after the fly Q returns to horizontal position and before the arms L' have completed their rearward movement, and this forward movement of the rods $P^9$ brings the cutting-off mechanism far enough front so that the rearward slat will always come into contact with the stop block W, and the rearward movement of the wood carpet caused by the arms L' pressing it back against the stop block W, will push the cutting-off mechanism back to exactly the proper position, whether the variation in the aggregate width of the slats be toward one extreme or the other, and while at this point the knives and all the cutting-off mechanism operate, before the rods $P^9$ and mechanism attached return to forward position to receive another square. The variation in the width of the few slats contained between the stop block W and the knives P' and $P^2$, will be so slight that the knives will always cut exactly or almost exactly in the line between the square that is to be cut off and the remaining piece of wood carpet. The extreme of variation in the aggregate width of all the slats between stop block W and the arms L' would in actual work not exceed about one-quarter of an inch, so that the backward and forward movement of the rods $P^9$ will be but little more than one-quarter of an inch; and the levers and links connecting the cams on shaft V with the various parts of the cutting-off mechanism adjust themselves to the varying position of the rods $P^9$; and the whole works as well when the rods are at one point as at another in this limit of about one-quarter of an inch. From this it will be seen that the forward movement places the cutting-off mechanism in position to receive a square and is caused by the cam $P^{32}$ and connections, while the rearward movement is the adjustment of the cutting-off mechanism to the square it is receiving and is caused by the arms L'.

The stop block W is provided with a rearward extension $W^2$ carrying an adjustable collar $W^3$ and forming a bearing for a sleeve $W^4$ having a slotted head $W^5$ adapted to extend over the top surface of the piece of parquetry flooring abutting at the time against the stop block W. A setscrew $W^6$ engages the slotted head $W^5$, to guide the same, and from the said head $W^5$ depends a pin $W^7$ (see Fig. 10), adapted to abut against a cross bar $P^{33}$ adjustably attached to the rods $P^9$ and thus forming part of the frame $P^8$. By the arrangement described the sleeve $W^4$ and its head $W^5$ are held in a forward position by the pin $W^7$ resting against the cross bar $P^{33}$; but when the fly Q swings upward, then the pin $W^7$ leaves the cross bar $P^{33}$, and the sleeve $W^4$ with its head $W^5$ now slides, by its own weight, down on the extension $W^2$, until it rests on the stop collar $W^3$. When this takes place the head $W^5$ disengages the square carried by the fly Q, and consequently the square is free to leave the fly and pass onto the buncher R. When the fly Q swings back to its normal position, then the pin $W^7$, in striking against the cross bar $P^{33}$, pushes the sleeve $W^4$ and its head $W^5$ again forward, so that the head is in position for engaging the top of the square. When changing from one size square to another, only two adjustments are necessary in the cutting-off mechanism; namely, the stop block W is to be set the proper distance from the knives P' and $P^2$ and the rod $P^{33}$ is to be properly set to engage the projection $W^7$ of the stop block W.

The construction of the buncher R is as follows: The buncher R is mounted on a suitably constructed frame R' attached to the rear end of the main frame A, and on the said frame R' is secured a table $R^2$ over which pass a number of endless bands or belts $R^3$, supporting a rest $R^4$ over the table $R^2$ and against which the squares are bunched. The bands $R^3$ pass over pulleys $R^5$ and $R^6$ journaled at the ends of the frame R', and on the shaft $R^7$ for the pulley $R^6$ is secured a ratchet wheel $R^8$ (see Fig. 10) engaged by a pawl $R^9$ held on a lever $R^{10}$ fulcrumed, at $R^{11}$, on the main frame A and engaged by a cam $R^{12}$ secured on the cam shaft U, so that at every revolution of the cam shaft U the cam $R^{12}$ imparts a swinging motion to the lever $R^{10}$, which, by the pawl $R^9$, turns the ratchet wheel $R^8$ the distance of a tooth, so that the pulley $R^6$ is correspondingly turned and thereby imparts a traveling motion to the bands $R^3$ a distance corresponding to about the thickness of a square. By the arrangement described, the rest $R^4$ is moved gradually rearwardly as the squares are delivered to the buncher R by the fly Q. In order to properly guide and strengthen the rest $R^4$, the latter is provided with a guide rod $R^{13}$ engaging a bearing $R^{14}$ attached to the frame R'. A guide $R^{15}$ is arranged on the forward end of the frame R', to form a rest for the lower edge of a square, as the latter is carried upward by the fly Q onto the bands $R^3$. After the desired number of squares have been stacked or bunched on the buncher R, the same are removed by an operator, and then the pawl $R^9$ is lifted off the ratchet wheel $R^8$, to permit of returning the rest $R^4$ to a forward position on the table $R^2$.

The operation is as follows: When the hopper B is filled with a pile of strips of wood and the main shaft S is rotated, then motion is given to the various devices, to actuate the same in unison and in proper sequence, so that the strips of wood contained in the hopper B are successively cut into slats E, and the latter are united by the web E', to form individual squares of a given predetermined size and each having its slats from the same strip of wood. The machine is capable of cutting strips of any length, say from 2 inches to 51 inches, but is mainly intended to form squares from strips $1\frac{1}{3}$ inches and 2 inches wide, and multiples of 4, 6, 8 and 12 inches long. Thus, Fig. 26 shows a 4-inch square formed of two slats of 2"x4"; Fig. 27 illustrates a 4-inch square of three slats $1\frac{1}{3}$"x 4"; Fig. 28 shows a 6-inch square of three slats 2"x6"; Fig. 29 shows an 8-inch square of four slats 2"x8"; Fig. 30 shows an 8-inch square of six slats $1\frac{1}{3}$"x8"; Fig. 31 illustrates a 12-inch square of six slats 2"x12", and Fig. 32 shows a 12-inch square having nine slats $1\frac{1}{3}$"x12". Now, for each size of square, the machine is correspondingly set, and for this purpose the front B' of the hopper B is adjusted to the width of the strips, which latter are somewhat in excess of the width of the finished slats, to allow for trimming by the cutter heads H and H'. The auxiliary ends $B^9$ and $B^{10}$ are adjusted to the length of the strips, which latter have a given size exceeding, somewhat, the aggregate length of the slats for a square, to allow for the reduction by the cuts made by the saws D and trimming saws O and O'. The pusher arms F' are arranged in pairs and set according to the number of slats in a square, as indicated in Fig. 8, in which the numerals represent the size of the squares, it being understood that one pair of such arms F' is used for each slat. The guides $F^{14}$, the beams $C^3$, the saws D and the rocking arms G' are set according to the pushing arms F' and along the graduations marked on the respective parts, as before explained and shown in Figs. 6 and 9, and the sides of the guideways $G^2$ are set correspondingly to the width of the slats, and the guideways $J^2$ are set to the length of the slats, and the guideway T to the final size of the square (see Fig. 13). As illustrated in the drawings, the machine is set for forming an 8-inch square (see Fig. 30) of six slats of $1\frac{1}{3}$ inches wide and 8 inches long. Now, when the machine is running, the saws D cut the lowermost strip of wood in the hopper B resting at the time on the reciprocating pushing arms F' into six slats. After the saws have moved into a lowermost position the pushing arms F' have reached their front end position, and in doing so have passed from underneath the slats, to engage the front sides thereof, it being understood that the slats and the pile of strips above, on the pushing arms F' leaving the slats, drop down, so that the slats rest on the platform C. The forward movement of the arms F' now pushes the slats out from underneath the next strip of wood, and as the gate $B^{18}$ is now in a raised position, the slats pass over the platform C, under the raised front $G^5$ of the guideway $G^2$, so that the slats are finally delivered on top of the rocking arms G' now in a horizontal position, as indicated in Fig. 7. The pushing arms F' now recede, and during their reciprocating motion the saws D cut the next lowermost strip into six slats. In the meantime the front $G^5$ closes and the rocking arms G' are swung into an inclined position, as indicated in Fig. 7, to incline the slats thereon. An arm $G^4$ now engages the outermost slat in the guideway $G^2$ and pushes the same along in the direction of the arrow b' and onto the top of the next following slat, which is then pushed along in a like manner. The slats are thus moved one on top of the other; that is, formed into a stack or pile carried along the guideway $G^2$ by the arm $G^4$. During their passage through the guideway $G^2$, the stack of slats is trimmed by the cutter heads H and H', and the stack of slats finally moves in engagement with the inclined arm I' of the pusher I, so that the latter is raised and drops behind a stack of slats in place of the arm $G^4$, which now passes downward out of engagement with the stack of slats. The pusher I now pushes the stack of slats into the hopper J, in which the stack drops, by its own weight, through the opening $J^5$, onto the table $J^3$; and the lowermost slat is now engaged at its front side by the arms of the reciprocating pusher K, so that the slats are successively pushed out of the hopper J and forward over the table $J^3$, with the ends of the slats extending in the guideways $J^2$. By the arrangement described the slats are successively pushed out from the hopper J and thus ranged lengthwise side by side, and when the number of slats for one square have been pushed forward over the table $J^3$ in front of the arms L', then the latter move forward and thus push the slats (in this case the six slats) forward under the web-attaching device N, to receive the web E', as previously explained.

It is understood that the series of gear wheels $K^5$ is adjusted relative to the gear wheel $K^{16}$, according to the number of slats to be formed into one square, so that the pusher K reciprocates, in this case, six times to one reciprocating movement given to the pushing device L. As the sets of slats advance intermittently under the web-attaching device N, the several sets are united with each other by the endless web E', to form a continuous piece of parquetry flooring. This piece is intermittently pushed along by the following sets of slats moved forward by the pushing device L, and as the piece of parquetry flooring passes between the saws O and O', the ends of the slats are trimmed to the proper size. The piece of parquetry flooring, after being trimmed, passes over the slatted bottom T', along the guideways T and onto the rods Q' of the fly Q, until the front side of the piece abuts against the stop block W, the forked head $W^5$ reaching over the upper face of the piece of parquetry flooring. At this time the piece of parquetry flooring is at rest and the cutting device P now becomes active; that is, the cross head $P^6$ moves transversely and returns to its original position of rest; and during this transverse movement the knives P' and $P^2$ cut the web E' at the joint of two slats, or adjacent to the joint, the forward one of the slats thus cut off being the last belonging to a square.

During the cutting operation the bar V is yieldingly held down on the piece of parquetry flooring, to insure proper cutting; and when the cutting operation is completed, the plate $V^{12}$ moves upward, so as to completely lift the rods Q' and to break off the square, in case the web E' is not completely severed. The fly Q now swings upward and carries the square with it, and during the upward movement of the fly the slide $W^4$ and its head $W^5$ drop down on the arm $W^2$, so that the head $W^5$ disengages the square, which now travels up over the curved guide $R^{15}$ onto the bands $R^3$, to be stacked on the bunching device R. As soon as the square is delivered the fly moves downward, back to its horizontal position, and at this time the piece of parquetry flooring receives another reciprocating movement, so that the forward portion of the piece moves onto the rods Q' of the fly Q, until it comes to a rest at the stop block W. The rest $R^4$ of the bunching device R is intermittently receded, so that the squares are properly delivered by the fly and bunched, as above explained.

The hopper B is preferably kept full of strips of wood, so that the weight of the pile of strips keeps the bottom strips properly flattened out, in case they are slightly "bowed", as is sometimes the case, especially when long strips of wood are used.

The pushing arms F' are located adjacent to the saws D, so that each pair of arms F' engages a slat near the ends thereof, it being understood that the thickness of the arms F' corresponds to the thickness of the strips of wood and the slats cut therefrom, and the front ends of the arms F' are slightly beveled at the top and sides to readily pass from underneath the slats at the time the arms move into their front or beginning position, and to prevent the arms F' from engaging the next strip of wood above the slats. By the use of the rising and falling gate $B^{18}$ and the guideways $F^{14}$, the bottom of the hopper is kept "tight", to prevent the slats and strips from assuming undesirable positions.

The rocking arms G' are of a length corresponding approximately to the length of the slats, and the arms G' are swung upward to bring the raised end of a slat slightly above the lowermost end of the slat ahead, so that the slats readily slide one on top of the other when pushed forward by the arm $G^4$. It will also be noticed that the slats remain throughout with the same faces down and the slats in a square are ranged one alongside the other in the very order in which they are cut from the strip by the saws D. Thus the first slat cut from one end of the strip forms the outer one for the square; the next slat cut from the strip ranges in the square next the outer one mentioned, and so on, so that any variation in color or grain in the original strip is distributed in the square to the best advantage.

In case it is desired to make a square from slats cut from two strips of wood, then the arms F' are provided on top with a supplementary arm $F^{18}$ (see Fig. 25), to increase the thickness of the pushing arms to that of two strips of wood in the hopper B. In this case the gate $B^{18}$ is raised double the distance by making the corresponding adjustment on the links $B^{22}$. Corresponding adjustments are necessary if it is desired to make a square from slats cut from three or more strips of wood. It is understood that in either case the slats from the different strips alternate in position in the finished squares; that is, one slat from one strip lies adjacent to a slat from the other strip, and so on throughout the square.

The adjustments of the several parts required for changing the machine for making different squares can be quickly made and by an ordinary mechanic.

If desired, the cutting device P, the fly Q and the bunching device R may be dispensed with, so that the product of the machine is the continuous piece of parquetry flooring cut up into desired lengths and rolled and commercially known as wood carpet.

Although I have shown and described the machine for making squares it is evident that the machine is capable of making rectangles, and if desired the slats in a square or rectangle may be of different woods arranged alternately.

Having thus described my invention, I claim as new and desire to secure by Letters Patent:—

1. A machine for making wood carpet squares, provided with a hopper for containing a pile of strips of wood, a cutting device for cutting the lowermost strip transversely into slats of equal lengths, means for stacking the slats in superimposed relation, a pushing device for pushing the slats away from the bottom of the hopper, and into the stacker, means for arranging the slats in edgewise relation, and means for securing a web of fabric material to the slats.

2. A machine for making wood carpet squares, provided with a hopper for containing a pile of strips of wood, a cutting device for cutting the lowermost strip into slats of equal lengths, means for stacking the slats in superimposed relation, a pushing device for pushing the slats away from the bottom of the hopper into the stacking means, the said stacker having rock arms for inclining the slats, and a carrier engaging the ends of the slats and pushing one on top of the other.

3. A machine for making wood carpet squares, provided with a hopper for containing a pile of strips of wood to be cut into slats, a platform below the said hopper for the slats of wood to rest on and having fixed transverse beams and longitudinal beams adjustably held on the said fixed transverse beams, and a sawing device for cutting the lowermost strip of wood transversely into a number of slats of equal lengths, the sawing device comprising a driven saw arbor, circular saws secured thereon and means for moving the saw arbor bodily up and down, the said adjustable longitudinal beams determining the positions of the said circular saws on the arbor and being provided with longitudinal ribs in the plane of the saw for guiding the slats.

4. A machine for making wood carpet squares, provided with a hopper for containing a pile of strips of wood to be cut into slats, a platform below the said hopper for the slats of wood to rest on and having fixed transverse beams and longitudinal beams adjustably held on the said fixed transverse beams, a sawing device for cutting the lowermost strip of wood into a number of slats of equal lengths, the sawing device comprising a driven saw arbor, circular saws secured thereon and means for moving the saw arbor bodily up and down, the said adjustable longitudinal beams determining the positions of the said circular saws on the arbor, guideways adjustably depending from the lower end of the said hopper directly above the said longitudinal adjustable beams, and a reciprocating pusher having longitudinal arms adapted to travel on the said longitudinal beams and guided in the said guideways.

5. A machine for making wood carpet squares, provided with a hopper for containing a pile of strips of wood, a sawing device capable of rising and dropping bodily for sawing the lowermost strip of wood into the number of slats required for making one square, and a platform for the slats of wood to rest on and having slots for the passage of the saws of the said sawing device, said platform being provided with ribs at the ends of the slots for engagement by the ends of the slats.

6. A machine for making wood carpet squares, provided with a hopper for containing a pile of strips of wood, a sawing device capable of rising and dropping bodily for sawing the lowermost strip of wood into the number of slats required for making one square, a platform for the slats of wood to rest on and having slots for the passage of the saws of the said sawing device, said platform being provided with ribs at the ends of the slots for engagement by the ends of the slats, and guides depending on the front of the hopper.

7. A machine for making wood carpet squares, provided with a hopper for containing a pile of strips of wood, a sawing device capable of rising and dropping bodily for sawing the lowermost strip of wood into the number of slats required for making one square, a platform for the slats of wood to rest on and having slots for the passage of the saws of the said sawing device, said platform being provided with ribs at the ends of the slots for engagement by the ends of the slats, guides depending on the front of the hopper, and weighted arms engaging the under side of the slats of wood.

8. A machine for making wood carpet squares, provided with a stacker having a guideway, rocking arms ranging lengthwise in the said guideway and adapted to support slats, and a traveling arm passing through the guideway and engaging the ends of the slats at the time their rocking arms are inclined.

9. A machine for making wood carpet squares, provided with a stacker having a guideway, rocking arms ranging lengthwise in the said guideway and adapted to support slats, a traveling arm passing through the guideway and engaging the ends of the slats at the time their rocking arms are inclined, means for adjustably supporting the said rocking arms, and means for imparting an intermittent rocking motion to the same.

10. A machine for making wood carpet squares, provided with a stacker comprising a guideway having a front and an adjustable rear, means for raising the said front, rocking arms in the bottom of the guideway, means for intermittently rocking the same, a pushing device for pushing slats onto the said rocking arms at the time the said front is raised, and means for pushing the slats along while inclined to stack the slats.

11. A machine for making wood carpet squares, provided with a cutting device for cutting the web uniting the slats of a piece of parquetry flooring, a holding-down device adjacent to one side of the cutting device for holding the said piece of parquetry flooring against movement, and a breaking device for engaging the square at the other side of the cutting device and after cutting of the web, to break the square off the piece.

12. A machine for making wood carpet squares, provided with a cutting device for cutting the web uniting the slats of a piece of parquetry flooring, a holding-down device adjacent to one side of the cutting device for holding the said piece of parquetry flooring against movement, a breaking device for engaging the square at the other side of the cutting device and after cutting of the web, to break the square off the piece, and a fly for taking hold of the square and delivering it to a place of discharge.

13. A machine for making wood carpet squares, provided with a cutting device for cutting the web uniting the slats of a piece of parquetry flooring, a holding-down device adjacent to one side of the cutting device for holding the said piece of parquetry flooring against movement, a breaking device for engaging the square at the other side of the cutting device and after cutting of the web, to break the square off the piece, a fly for taking hold of the square, and a buncher receiving the square from the fly.

14. A machine for making wood carpet squares, provided with a cutting device for cutting the web uniting the slats of a piece of parquetry flooring, a holding-down device adjacent to one side of the cutting device for holding the said piece of parquetry flooring against movement, a breaking device for engaging the square at the other side of the cutting device and after cutting of the web, to break the square off the piece, and a fly for taking hold of the square and provided with a stop for the end of the piece of parquetry flooring to rest on.

15. A machine for making wood carpet squares, provided with a cutting device for cutting the web uniting the slats of a piece of parquetry flooring, a holding-down device adjacent to one side of the cutting device for holding the said piece of parquetry flooring against movement, a breaking device for engaging the square at the other side of the cutting device and after cutting of the web, to break the square off the piece, a fly for taking hold of the square and provided with a stop for the end of the piece of parquetry flooring to rest on, and a movable head on the said stop for extending over the face of the piece of parquetry flooring.

16. A machine for making wood carpet squares, provided with a cutting device for cutting the web uniting the slats of a piece of parquetry flooring, a holding-down device adjacent to one side of the cutting device for holding the said piece of parquetry flooring against movement, a breaking device for engaging the square at the other side of the cutting device and after cutting of the web, to break the square off the piece, a fly for taking hold of the square and provided with a stop for the end of the piece of parquetry flooring to rest on, and a movable head on the said stop for extending over the face of the piece of parquetry flooring, the said head moving by its own weight out of engagement with the said face, on the fly swinging upward.

17. A machine for making wood carpet squares, provided with a table, a guideway thereon for the passage of a piece of parquetry flooring, means for imparting a reciprocating motion thereto, a cutting device for transversely cutting the web of the said piece of parquetry flooring, a holding device for holding the piece of parquetry flooring down on the table on one side of the cutting device, a breaking off device on the other side of the cutting device and engaging the under side of the square, and means for imparting motion to the said cutting device, the holding down device and the breaking off device, in the proper sequence.

18. A machine for making wood carpet squares, provided with a table, a guideway thereon for the passage of a piece of parquetry flooring, means for imparting a reciprocating motion thereto, a cutting device for transversely cutting the web of the said piece of parquetry flooring, a holding down device for holding the piece of parquetry flooring down on the table on one side of the cutting device, a breaking off device on the other side of the cutting device and engaging the under side of the square, a frame mounted to slide longitudinally and carrying the said cutting device, the said holding down device and the said breaking off device, and means for imparting motion to the said cutting device, the holding down device, the breaking off device and the said frame, in the proper sequence.

19. A machine for making wood carpet squares from a piece of parquetry flooring, provided with an intermittently reciprocating feeding device for feeding the said piece of parquetry flooring in the direction of its length, a cutting device moving transverse of the said piece of parquetry flooring for cutting the web thereof to form wood carpet squares, means for intermittently reciprocating the said cutting device at the time the said feeding device is at rest, and a breaking off device for breaking off the square after the cutting device has come to rest and immediately previous to the starting of the feeding device.

20. A machine for making wood carpet squares from a piece of parquetry flooring, provided with an intermittently reciprocating feeding device for feeding the said piece of parquetry flooring in the direction of its length, a cutting device moving transverse of the said piece of parquetry flooring for cutting the web thereof to form wood carpet squares, means for intermittently reciprocating the said cutting device at the time the said feeding device is at rest, a breaking off device for breaking off the square after the cutting device has come to rest and immediately previous to the starting of the feeding device, and means for removing the square out of the path of the piece of parquetry flooring.

21. A machine for making wood carpet squares, comprising a guideway, means for moving a stack of superimposed slats along the guideway, a hopper at the delivery end of the guideway, means for pushing the stack of slats from the guideway into the hopper, a receiving table for the stack below the hopper, means for arranging the slats of a stack with their edges abutting, and means for securing a strip of fabric material to the slats when so arranged.

22. A machine for making wood carpet squares, comprising a guideway, means for moving a stack of slats along the guideway, a hopper at the delivery end of the guideway, means for pushing the stack of slats from the moving means into the hopper, a receiving table for the stack below the hopper, means for pushing the lowermost slat sidewise out of the hopper on to the table, whereby to arrange the slats with their edges abutting, and means for securing a strip of fabric material to the slats when so arranged.

23. A machine for making wood carpet squares, comprising a guideway, means for moving a stack of slats along the guideway, a hopper at the delivery end of the guideway, means for pushing the stack of slats from the guideway into the hopper, a receiving table for the slats below the hopper, means for removing the slats from the hopper and arranging them on the table with their edges abutting, and means for securing a strip of fabric material to the slats while in such position.

24. A machine for making wood carpet squares, comprising a guideway, means for moving a stack of superimposed slats along the guideway, a receiving table at the end of the guideway, means for arranging the slats of the stack on the table with their edges abutting, means for securing a strip of fabric material to the slats while so arranged, and a cutting device for separating the portion of the fabric material secured to the slats from the remaining portion.

25. In a machine of the class described, means for moving a series of edgewise abutting slats in a direction transverse to the length of the slats, means for securing a strip of fabric material to the slats, a cutting device reciprocating in the direction of travel of the slats, said device comprising a blade movable transversely of the direction of travel of the slats, and a stop against which the slats abut during the cutting of the web, said stop being connected with the cutting device to move therewith.

26. In a machine of the class described, means for moving a series of edgewise abutting slats in a direction transverse the length of the slats, means for securing a strip of fabric material to the slats, a cutting device for severing the strip reciprocable in the direction of travel of the slats, a stop against which the slats abut during the cutting operation, and a connection between the stop and the cutting device, whereby the movement of the cutting device will move the stop.

27. In a machine of the class described, a guideway for receiving a series of edgewise abutting slats, means for securing a strip of fabric material to the slats, means for cutting the strip transversely at intervals, means for reciprocating the cutting means longitudinally of the guideway, a stop against which the slats abut during the cutting operation and means in connection with the cutting device for engaging the stop to move the same in unison with the forward movement of the cutting device.

28. In a machine of the class described, a guideway for receiving a series of edgewise abutting slats, means for securing a strip of fabric material to the slats, means for cutting the strip transversely at intervals, means for clamping the slats during the cutting of the strips, means for reciprocating the cutting means longitudinally of the guideway, a stop against which the strips abut during the cutting operation and means in connection with the cutting device for engaging the stop to move the same in unison with the forward movement of the cutting device.

29. In a machine of the class described, a guideway for receiving a series of edgewise abutting slats, means for securing a strip of fabric material to the slats, means for severing the strip at spaced intervals, a fly upon which the severed portion of the slats rest during the cutting operation, a movable stop against which the slats abut, means for moving the severing means over and away from over the fly, and means in connection with said means for engaging the stop to position the same when the cutting device moves over the fly.

30. In a machine of the class described, a guideway, means for moving a series of slats through the guideway, means for securing a strip of fabric material to the slats, a cutting device for severing the strip at intervals comprising a cross head reciprocable transversely of the guideway, a holder pivoted to the cross head, and knives secured to the holder, one of said knives being adapted to cut when the cross head is moved in one direction, and the other when the cross head is moved in the opposite direction.

In testimony whereof I have signed my name to this specification in the presence of two subscribing witnesses.

CHARLES M. KREBS.

Witnesses:
FRED. C. STODDARD,
L. C. SHERWOOD.